United States Patent
Otaka

(10) Patent No.: US 6,990,326 B2
(45) Date of Patent: Jan. 24, 2006

(54) IMAGE SUPPRESSION FILTER CIRCUIT

(75) Inventor: Shoji Otaka, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 802 days.

(21) Appl. No.: 09/897,911

(22) Filed: Jul. 5, 2001

(65) Prior Publication Data

US 2002/0019220 A1 Feb. 14, 2002

(30) Foreign Application Priority Data

Jul. 5, 2000 (JP) .................................. 2000-203655

(51) Int. Cl.
*H04B 1/10* (2006.01)

(52) U.S. Cl. ................ 455/302; 455/114.2; 455/323
(58) Field of Classification Search ............ 455/105, 455/118, 114.2, 285, 302, 313, 314, 323
See application file for complete search history.

(56) References Cited

U.S. PATENT DOCUMENTS

| | | | | |
|---|---|---|---|---|
| 4,584,715 A | * | 4/1986 | Baars et al. | 455/302 |
| 5,678,220 A | * | 10/1997 | Fournier | 455/302 |
| 5,901,349 A | * | 5/1999 | Guegnaud et al. | 455/302 |
| 6,148,181 A | * | 11/2000 | Otaka | 455/86 |
| 6,516,186 B1 | * | 2/2003 | Yamagishi et al. | 455/302 |
| 6,714,776 B1 | * | 3/2004 | Birleson | 455/302 |
| 6,816,712 B2 | * | 11/2004 | Otaka et al. | 455/83 |

OTHER PUBLICATIONS

Jan Crols, et al., "A Single–Chip 900 MHz CMOS Receiver Front–End with a High Performance Low–IF Topology", IEEE Journal of Solid–State Circuits, vol. 30, No. 12, pp. 1483–1492, Dec. 1995.

* cited by examiner

*Primary Examiner*—Harry S. Hong
(74) *Attorney, Agent, or Firm*—Oblon, Spivak, McClelland, Maier & Neustadt, P.C.

(57) ABSTRACT

An image suppression filter circuit comprises a first phase shifter outputting a first output signal and a second output signal substantially orthogonal thereto, a second phase shifter outputting a third output signal and a fourth output signal orthogonal to the third output signal, a first subtracter subtracting the fourth output signal from the first output signal, a first adder adding the second and third output signals, a third phase shifter outputting a fifth output signal and a sixth output signal orthogonal to the fifth output signal, a fourth phase shifter outputting a seventh output signal and an eighth output signal orthogonal thereto, a second subtracter subtracting the eighth output signal from the fifth output signal, and a second adder adding the sixth and the seventh output signals.

20 Claims, 13 Drawing Sheets

$\theta = 2\tan^{-1}(1/\omega CR)$ $\theta = 2\tan^{-1}(1/\omega CR)$ $\theta = 2\tan^{-1}(1/\omega CR)$

IMAGE SUPPRESSION FILTER CIRCUIT

CROSS-REFERENCE TO RELATED APPLICATIONS

This application is based upon and claims the benefit of priority from the prior Japanese Patent Application No. 2000-203655, filed Jul. 5, 2000, the entire contents of which are incorporated herein by reference.

BACKGROUND OF THE INVENTION

1. Field of the Invention

The present invention relates to an image suppression filter circuit.

2. Description of the Related Art

Recently, a number of radio terminal systems such cellular phone, PHS, and the like are becoming popular. One of these radio systems is a system for wire communication between base stations, through radio communication between the radio terminal and the base station.

A radio terminal for transmission/reception with the base station through radio wave adopts in general a heterodyne scheme comprising an antenna, a low noise amplifier (LNA), a frequency converter (or mixer), an intermediate frequency band pass filter (IF-BPF), an intermediate frequency mixer (IF-MIX), a low pass filter (LPF), and an analog-to-digital converter (ADC).

The radio terminal, having such a circuit configuration, receives a radio frequency (RF) signal as a high frequency signal by the radio terminal antenna and amplifies it with the low noise amplifier. This amplified high frequency signal is frequency converted from high frequency RF to intermediate frequency by the frequency converter, filtered by the IF-BPF and converted into a digital signal by the A/D converter through the IF-MIX and the LPF.

As an integrated circuit necessary for the radio terminal, there is an image suppression filter circuit for suppressing image signal mixed into a desired frequency.

An image signal is a frequency signal converted into the same frequency band as the intermediate frequency band into which the wanted wave is converted, when the received radio wave is converted from high frequency to intermediate frequency by the frequency converter.

The frequency converter outputs intermediate frequency which is obtained by subtracting a local frequency from a wanted frequency. However, this frequency converter also converts a frequency component obtained by subtracting this intermediate frequency band from the local signal into the same intermediate frequency band. This frequency component is an image wave to become an unwanted wave.

In addition, various systems transmit and receive signals of various frequencies, and a wanted wave of one system becomes an interference wave of another system, and it further becomes an image signal.

Besides, the broadband noise emitted by the transistor itself provides an image signal. Broad band noise includes thermal noise, shot noise or the like.

Such an image signal results in overlapping the same frequency band as the frequency converted wanted band. The waves other than wanted wave are unwanted; however, as the image signal is converted into the same frequency as the wanted wave, an image suppression filter circuit for suppressing image signal is required.

In an image suppression filter circuit used for the frequency converter of the aforementioned radio terminal reception system, first an RF signal is divided into two. One RF signal is frequency converted into an inphase signal by a cosine wave local signal generated in a first 90 degree phase shifter connected to a local oscillator signal, while the other RF signal is frequency converted into a quadrature signal by a sine wave local signal generated in the first 90 degree phase shifter.

Next, the quadrature signal frequency converted by the sine wave is further phase shifted by 90 degrees by a second 90 degree phase shifter, added with the inphase signal which is frequency converted by a cosine wave by an adder, thereby suppressing the image wave.

Incidentally, if frequency conversion is performed simply by the local signal without removing image signal, the signal is folded, and the wanted signal and the image signal are converted into the same frequency. In short, the wanted signal is spoiled by the image signal. Then, if image suppression is performed, the image wave can be reduced while maintaining the wanted wave.

In other words, suppose the wanted wave signal conversion gain be 1, the image wave conversion gain may be reduced to a small number not more than 1 (for instance, 0.01). This can prevent the wanted wave signal from being spoiled by the image wave.

This image suppression filter circuit allows a satisfactory filter function to be achieved to some extent, even when the quality of an inductor or capacitor is low due to integration.

Such an image suppression filter circuit uses a high phase accuracy phase shifter wherein a phase is high and precisely constant for a wide range, or a high amplitude accuracy phase shifter wherein the output amplitude accuracy is high and precisely constant for a wide range image. Though satisfactory in phase accuracy according to an applied frequency, the high phase accuracy phase shifter can not obtain sufficient filter characteristics in a radio system used for broadband, as its output amplitude is not constant.

The high amplitude phase shifter has a goof output amplitude accuracy corresponding to the applied frequency. However, since the output phase accuracy is constant, a sufficient filter characteristic is not obtained for a radio system used in a broadband range.

As mentioned above, a high phase accuracy phase shifter and high amplitude accuracy phase shifter can not obtain high phase accuracy and high amplitude accuracy in the broadband simultaneously, and an image suppression filter circuit used for broadband radio system can not be manufactured on the IC.

In addition, in a conventional portable radio system having a narrow wanted wave band, it was enough that the 90 degree phase shifter had a high phase accuracy and high amplitude accuracy only in a predetermined narrow band. However, in the future, the amount of radio system information is expected to increase, making the wanted wave band broader, and the 90 degree phase shifter will be required to maintain a high accuracy also in the broadband.

However, in the high phase accuracy phase shifter and high amplitude accuracy phase shifter, output amplitude and output phase vary respectively according to the frequency, leading to a problem that the image suppression ratio can not be increased in a broadband radio system.

It is an object of the present invention to provide an integrated image suppression filter circuit that can also be used for a broadband radio system.

BRIEF SUMMARY OF THE INVENTION

According to a first aspect of the present invention, there is provided image suppression filter circuit comprising a first phase shifter which receives an inphase input signal, and outputs a first output signal and a second output signal having a phase component substantially orthogonal to the first output signal, a second phase shifter which receives a quadrature input signal having a phase component substantially orthogonal to the inphase input signal, and outputs a third output signal having a first phase component as for the quadrature input signal and a fourth output signal having a phase component orthogonal to the third output signal, a first subtracter which subtracts the fourth output signal from the first output signal, and outputs a subtraction signal, a first adder which adds the second output signal and the third output signal, and outputs an addition signal, a third phase shifter which receives the subtraction signal, and outputs a fifth output signal having a second phase component as for the subtraction signal and a sixth output signal having a phase component orthogonal to the fifth output signal, a fourth phase shifter which receives the addition signal, and outputs a seventh output signal having the second phase component as for the addition signal and an eighth output signal having a phase component orthogonal to the seventh output signal, a second subtracter which subtracts the eighth output signal from the fifth output signal, and outputs a subtraction result as an inphase output signal, and a second adder which adds the sixth output signal and the seventh output signal, and outputs an addition result as a quadrature output signal.

According to a second aspect of the present invention, there is provided an image suppression filter circuit comprising a pre-stage phase shifter, and a plurality of rear-stage phase shifters, the pre-stage phase shifter including a first phase shifter which receives an inphase input signal, and outputs a first output signal and a second output signal having a phase component substantially orthogonal to the first output signal, second phase shifter which receives a quadrature input signal having a phase component substantially orthogonal to the inphase input signal, and outputs a third output signal having a first phase component as for the quadrature input signal and a fourth output signal having a phase component orthogonal to the third output signal, a first subtracter which subtracts the fourth output signal from the first output signal, and outputs a subtraction signal, and a first adder which adds the second output signal and the third output signal, and outputs an addition signal, and each of the rear-stage phase shifter including a third phase shifter which receives the subtraction signal, and outputs a fifth output signal having a second phase component as for the subtraction signal and a sixth output signal having a phase component orthogonal to the fifth output signal, a fourth phase shifter which receives the addition signal, and outputs a seventh output signal having the second phase component as for the addition signal and an eighth output signal having a phase component orthogonal to the seventh output signal, a second subtracter which subtracts the eighth output signal from the fifth output signal, and outputs a subtraction result as an inphase output signal, and a second adder which adds the sixth output signal and the seventh output signal, and outputs an addition result as a quadrature output signal.

DETAILED DESCRIPTION OF THE INVENTION

Figure 1A:
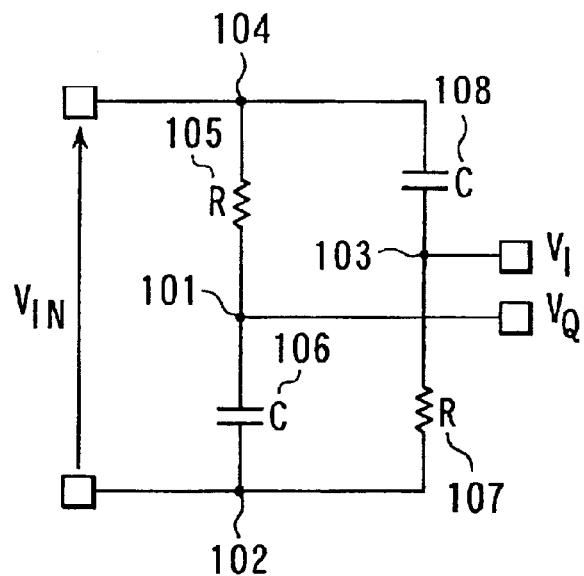
FIGS. 1A, 1B and 1C show a circuit diagram, an input frequency—output amplitude characteristic diagram, and an input frequency—output phase characteristic diagram of a high phase accuracy phase shifter, respectively.

Now, embodiments of the present invention will be described referring to the drawings. First, a high phase accuracy phase shifter and high amplitude accuracy phase shifter used for an image suppression filter circuit of the embodiments of the present invention will be described referring to FIGS. 1 and 2.

FIG. 1A shows a high phase accuracy phase shifter. In this high phase accuracy phase shifter, one end of a first resistor R105 is connected to a first end 101, and one end of a first capacitor C106 is connected to this first end 101. The other end of this first capacitor C106 is connected to a second end 102. This second end 102 is connected to one end of a second resistor R107. A third end 103 is connected to the other end of this second resistor 107. One end of a second capacitor C108 is connected to this third end 103. A fourth end 104 is connected to the other end of this second capacitor C108. This fourth end 104 and the other end of the first resistor R105 are connected. In short, the high phase accuracy phase shifter comprises a CR bridge circuit.

An input signal $V_{IN}$ of this CR bridge circuit is input as the potential difference between the fourth end 104 and the second end 102 and outputs an input dependent output signal $V_I$ and $V_Q$ (signal which is substantially orthogonal to $V_I$ within a range of ±10%, for example) respectively as the potential of the third end and the first end. Here, R of the first and second resistors, C of the first and second capacitors and the input signal $V_{IN}$ and the output signals $V_I$ and $V_Q$ represent respective symbols thereof, and at the same time, are used as values of expressions described below. In this case, the resistance values of the first resistor and the second resistor are made identical. In addition, in this case, the first capacitor and the second capacitor are set to the same value.

Figure 1B:
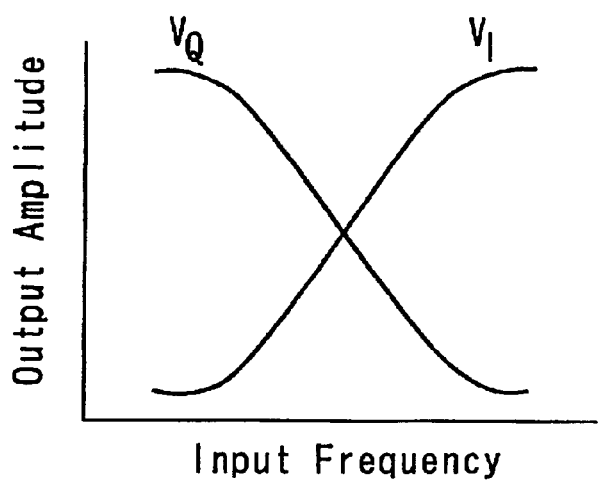
Figure 1C:
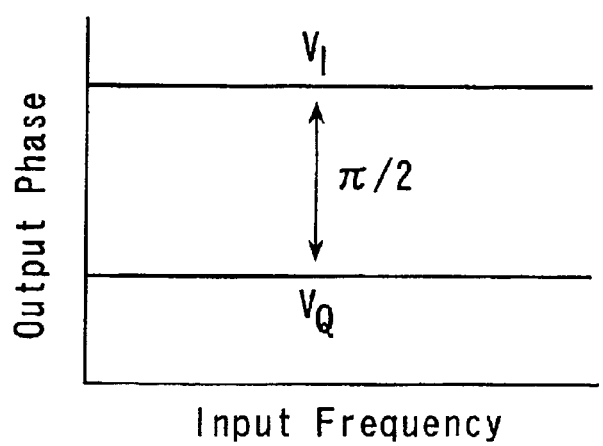

In this high phase accuracy phase shifter, as shown in the input frequency—output amplitude characteristics of FIG. 1B, the output amplitudes of $V_I$ and $V_Q$ varies according to the input frequency value; however, as shown in input frequency—output phase characteristics of FIG. 1C, the output phase difference of $V_I$ and $V_Q$ is constant at π/2 (90 degrees) independently of the input frequency, and it is characterized by a high accuracy phase conversion. This characteristic is evident from the transmission function of the high phase accuracy phase shifter shown below.

$$V_I/V_{IN}=R/(R+(1/j\omega C)) \quad (1)$$

$$V_Q/V_{IN}=(1/j\omega C)/(R+(1/j\omega C)) \quad (2)$$

In this case, the amplitude ratio (amplitude accuracy) of $V_I$ and $V_Q$ is R:1/jωC, the phase error is zero degrees (90 degree phased exactly).

In this high phase accuracy phase shifter, the phase accuracy is high and constant in a broadband frequency range. However, the image signal for a radio system used in the broadband can not sufficiently suppressed as described thereafter, since the output amplitude is not constant.

Figure 2A:
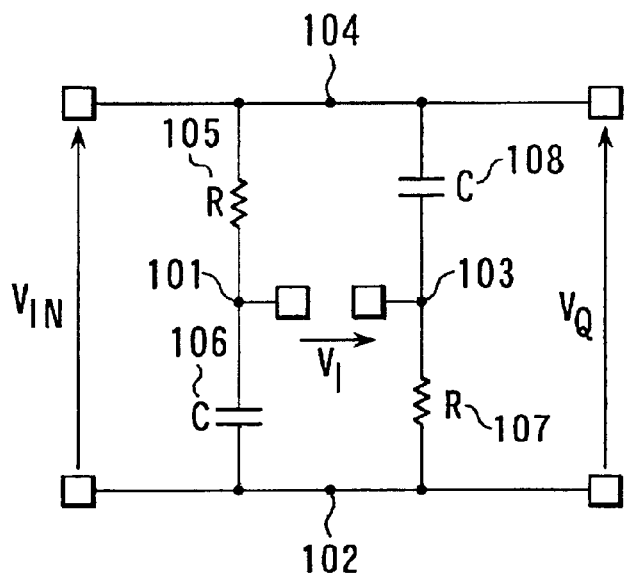
FIGS. 2A, 2B and 2C show a circuit diagram, an input frequency—output amplitude characteristic diagram, and an input frequency—output phase characteristic diagram of a high phase accuracy phase shifter, respectively.

FIG. 2A shows a high amplitude accuracy phase shifter. In this high amplitude accuracy phase shifter, one end of a first resistor R105 is connected to a first end 101, and one end of a first capacitor C106 is connected to this first end 101. The other end of this first capacitor C106 is connected to a second end 102. This second end 102 is connected to one end of a second resistor R107. A third end 103 is connected to the other end of this second resistor 107. One end of a second capacitor C108 is connected to this third end 103. A fourth end 104 is connected to the other end of second capacitor C108. This fourth end 104 and the other end of the first resistor R105 are connected.

As the foregoing, the high amplitude accuracy phase shifter includes a CR bridge circuit. An input signal $V_{IN}$ of this CR bridge circuit is input as the potential difference between the fourth end 104 and the second end 102, an output signal $V_I$ is output as the potential difference between the third end 103 and the forth end 10, while $V_Q$ (signal which is orthogonal to $V_I$ within a range of ±10%, for example) is output as the potential difference signal between the fourth end 104 and the second end 102. Here, R of the first and second resistors, C of the first and second capacitors and the input signal $V_{IN}$ and the output signals $V_I$ and $V_Q$ represent respective symbols thereof, and at the same time, are used as values of expressions described below. In this case, the resistance values of the first resistor and the second resistor are made identical. In addition, in this case, the first and second capacitors are set to the same value.

Figure 2B:
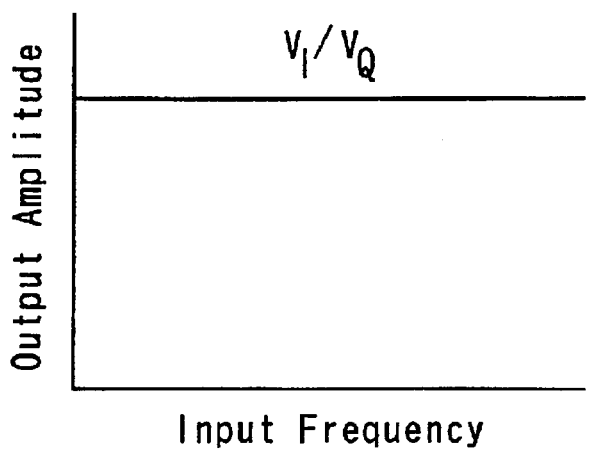
Figure 2C:
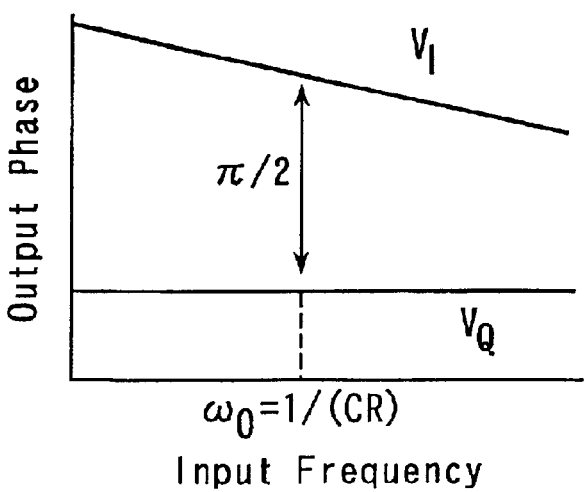

In this high amplitude accuracy phase shifter, as shown in the input frequency—output amplitude characteristics of FIG. 2B, the output amplitude ratio ($V_I/V_Q$) is precisely constant irrespective of the input frequency; however, as shown in input frequency—output phase characteristics of FIG. 2C, the output phase difference is characterized by varying according to the input frequency. This characteristic is also evident from the transmission function of the high phase accuracy phase shifter shown below.

$$V_I/V_{IN}=V_I/V_Q=(R-(1/j\omega C))/(R+(1/j\omega)C)) \quad (3)$$

In this case, the amplitude ratio (amplitude accuracy) of $V_I$ and $V_Q$ is 1, the phase error is $2\tan^{-1}(1/(\omega CR))$.

In this high amplitude accuracy phase shifter, the output amplitude accuracy is constant with a high accuracy over a broadband frequency, however, sufficient filter characteristics for a radio system used in the broadband can not be obtained as described thereafter, since the output phase accuracy is not high.

Figure 3:
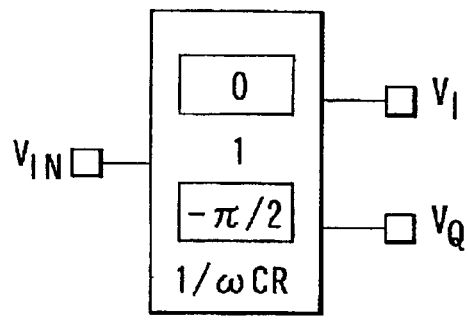
FIG. 3 is a circuit diagram and block diagram of a high phase accuracy phase shifter.
Figure 4:
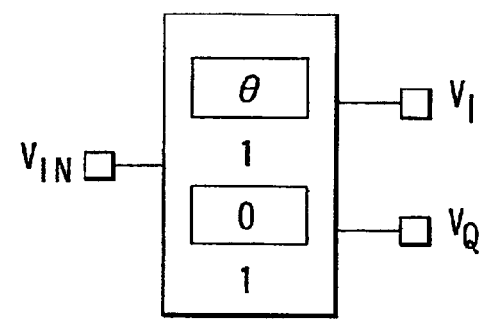
FIG. 4 is a circuit diagram and block diagram of a high amplitude accuracy phase shifter.

In order to simplify the description after drawings, the high phase accuracy phase shifter and the high amplitude accuracy phase shifter shown respectively in FIGS. 1A and 2A are shown by a block diagram in FIGS. 3 and 4. In the block diagram of FIGS. 3 and 4, $V_{IN}$ indicates an input signal, $V_I$ indicates a first output signal, $V_Q$ indicates a second output signal converted to a phase component orthogonal to the first input signal $V_I$. In the block diagram, the value surrounded by a square represents the phase, and the value noted under the square represent the amplitude.

The phase of the output signal $V_I$ of the high phase accuracy phase shifter shown in FIG. 3 is set to 0, and the output amplitude of the output signal $V_I$ to 1. Here, the output phase of the output signal $V_Q$ is set to −π/2 for the output signal $V_I$ independently of the frequency, and the output amplitude of the output signal $V_Q$ is set to 1/ωCR to be varied by the frequency ω.

The output phase of the output signal $V_Q$ of the high amplitude accuracy phase shifter shown in FIG. 4 is supposed to be 0, and the output amplitude of the output signal $V_Q$ is set to 1. The output signal $V_I$ output phase varies with the frequency ω as shown in the graphic of FIG. 2C, supposing θ=2 tan −1(1/(ωCR)) with respect to the output phase of $V_Q$, and the output amplitude of the output signal $V_I$ is set to 1. Thus, the output amplitude ratio is represented as $V_I/V_Q=1$.

Next, the image suppression filter circuit according to a first embodiment of the present invention using the block diagram of FIGS. 3 and 4 will be described referring to FIG. 5. This image suppression filter circuit according to the first embodiment of the present invention comprises a first high phase accuracy phase shifter 6, a second high phase accuracy phase shifter 7, a third high phase accuracy phase shifter 8 and a fourth high phase accuracy phase shifter 9, which are cascade-connected in two stages.

In this image suppression filter circuit, the first high phase accuracy phase shifter 6 receives an inphase input signal $I_{IN}$, and outputs a first output signal $V_I$, and a second output signal $V_Q$ having a phase component orthogonal to the first input signal $V_I$. The second high phase accuracy phase shifter 7 receives a quadrature input signal $Q_{IN}$ having a phase component substantially orthogonal to the inphase input signal $I_{IN}$, and outputs a third output signal $V_I$ and a fourth output signal $V_Q$ converted into a phase component orthogonal to the third output signal $V_I$.

Figure 5:
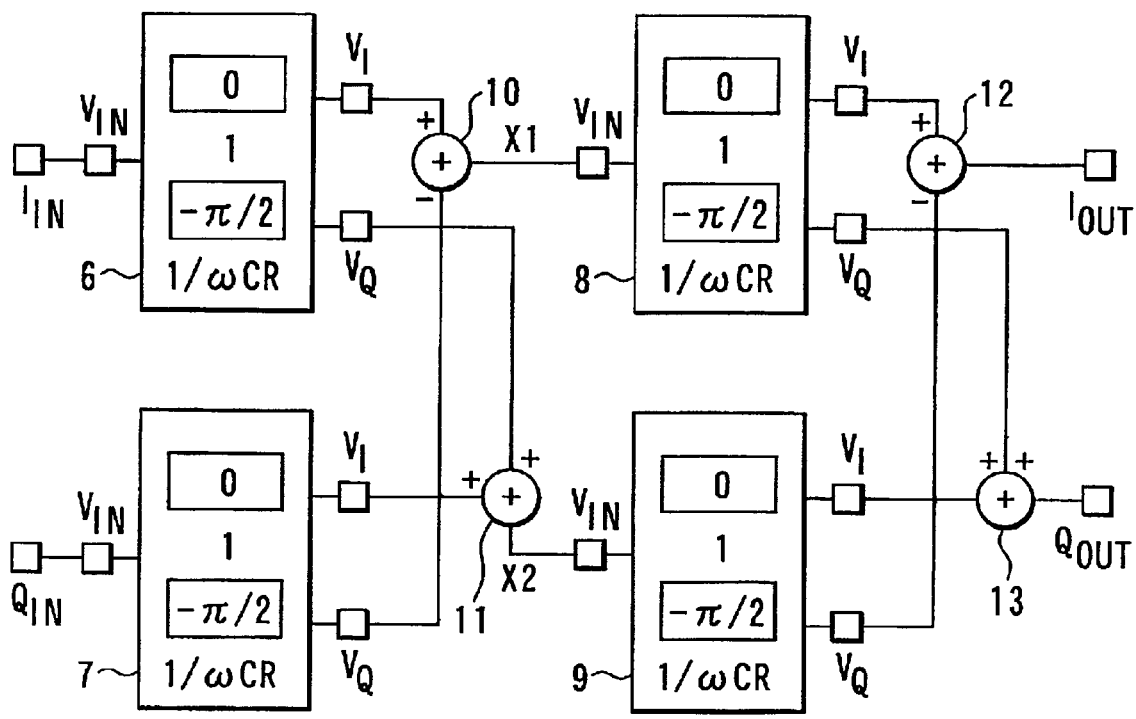
FIG. 5 is a circuit diagram of a broadband and high accuracy image suppression filter circuit according to a first embodiment of the present invention.

The inphase input signal $I_{IN}$ and quadrature input signal $Q_{IN}$ shown in FIG. 5 correspond, for instance, to inphase output and quadrature output of a former stage quadrature mixer (not shown), and become respectively the input signal $V_{IN}$ of the first high phase accuracy phase shifter 6 and the input signal $V_{IN}$ of the second high phase accuracy phase shifter 7.

The fourth output $V_Q$ output from the second high phase accuracy phase shifter 7 is subtracted from the first output signal $V_I$ output from the first high phase accuracy phase shifter 6 by a first subtracter 10, and this subtraction result is output as subtraction signal X1.

The second output signal $V_Q$ output from the first high phase accuracy phase shifter 6 and the third output signal $V_I$ output from the second high phase accuracy phase shifter 7 are added by a first adder 11 and this addition result is output as addition signal X2.

The subtraction signal X1 is input to the third high phase accuracy phase shifter 8, which outputs a fifth output signal $V_I$, and a sixth output signal $V_Q$ whose phase is orthogonal to the fifth output signal $V_I$.

The addition signal X2 is input to the fourth high phase accuracy phase shifter 9, which outputs a seventh output signal $V_I$ and an eighth output signal $V_Q$ whose phase is orthogonal to the seventh output signal $V_I$.

The eighth output signal $V_Q$ output from the fourth high phase accuracy phase shifter 9 is subtracted from the fifth output signal $V_I$ output from the third high phase accuracy phase shifter 8 by a second subtracter 12, and this subtraction result is an inphase output signal $I_{OUT}$.

The sixth output signal $V_Q$ output from the third high phase accuracy phase shifter 8 and the seventh output signal $V_I$ output from the fourth high phase accuracy phase shifter 9 are added by a second adder 13 and this addition result is a quadrature output signal $Q_{OUT}$.

The subtraction signal X1, addition signal X2, inphase output signal $I_{OUT}$, and quadrature output signal $Q_{OUT}$ of the thus constituted image suppression filter circuit can be expressed by the following expressions.

$$X1 = e^{j(\pi/2)}[I_{IN}e^{-j(\pi/2)} + (Q_{IN}/\omega CR)] \quad (4)$$

$$X2 = (I_{IN}/\omega CR)e^{-j(\pi/2)} + Q_{IN} \quad (5)$$

$$I_{OUT} = X1 - (X2/\omega CR)e^{-j(\pi/2)} \quad (6)$$
$$= e^{j(\pi/2)}[I_{IN}e^{-j(\pi/2)}\{1 + 1/(\omega CR)^2\} + Q_{IN}\{2/(\omega CR)\}]$$

$$Q_{OUT} = (X1/\omega CR)e^{-j(\omega/2)} - X2 \quad (7)$$
$$= I_{IN}e^{-j(\pi/2)}\{2/(\omega CR)\} + Q_{IN}\{1 + 1/(\omega CR)^2\}$$

Nearer 0 degree is the phase error, more removed is the image signal, and nearer 1 is the amplitude accuracy (amplitude ratio of inphase output signal and quadrature output signal) more removed is the image signal.

From the aforementioned expressions (4) and (5), if, for instance, $\omega CR$ is 1.2, the amplitude ratio $(1/(1/\omega CR))$ of inphase output signal and quadrature output signal remains 1.2, in a single stage image suppression filter circuit wherein the phase shifter comprises such that the subtraction signal X1 which is the output result of a single stage of the first high phase accuracy phase shifter 6 and the second high phase accuracy phase shifter 7 is set to the final inphase output signal. However, the phase difference of inphase output signal and quadrature output signal is 90 degrees.

On the other hand, the amplitude ratio $(\{1+1/(\omega CR)2\}/\{2/(\omega CR)\})$ of inphase input signal $I_{IN}$ and quadrature input signal $Q_{IN}$, becomes 1.017, at the inphase output signal $I_{OUT}$ and the quadrature output signal $Q_{OUT}$ which are output results of two stages of first high phase accuracy phase shifter 6, second high phase accuracy phase shifter 7 and third high amplitude accuracy phase shifter 8, fourth high phase accuracy phase shifter 9, as the image suppression filter circuit shown in FIG. 5, and the amplitude ratio is nearer to 1 (calculated from expressions (5) and (6)).

While the inphase input signal $I_{IN}$ phase is $e^{-j(\pi/2)}$, the quadrature input signal $Q_{IN}$ phase is $e^{j\circ}$ (=1), and inphase output signal $I_{OUT}$ and quadrature output signal $Q_{OUT}$ perform 90 degree phase accurately. Consequently, by cascade connection of high phase accuracy phase shifters, the amplitude ratio of inphase input signal $I_{IN}$ and quadrature input signal $Q_{IN}$ is 1.017, and is sufficiently smaller than 1.2 of the single stage, and the phase accuracy is constant at 90 degrees. As a result, an image suppression filter circuit high in amplitude accuracy and phase accuracy over a broadband is realized.

A high precision of phase accuracy and amplitude accuracy can be realized for a still broadband, by increasing the number of connection stages to be cascade connected. Also, the phase filters 6 and 7 are configured in the same circuit structure so that a phase difference between the output signals $V_I$ thereof is 90°. Similarly, the phase filters 8 and 9 are configured in the same circuit structure so that a phase difference between the output signals $V_I$ thereof is 90°.

Figure 6:
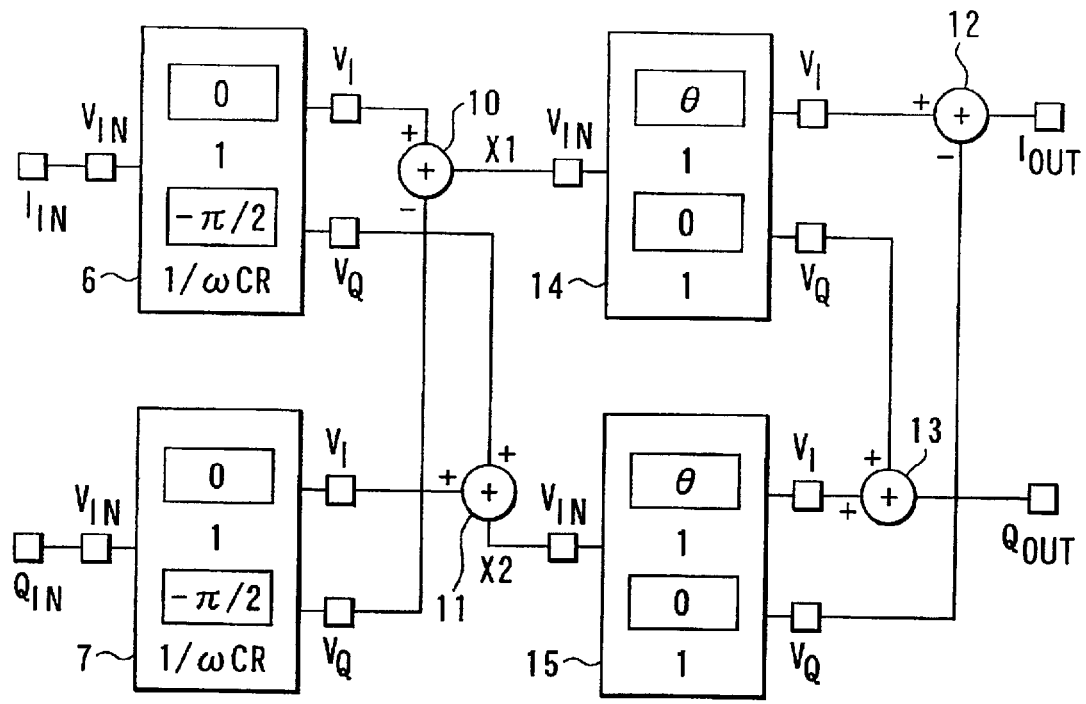
FIG. 6 is a circuit diagram of a broadband and high accuracy image suppression filter circuit according to a second embodiment of the present invention.

The circuit configuration diagram of the image suppression filter circuit according to a second embodiment of the present invention will be shown in FIG. 6 using the block diagram shown in FIGS. 3 and 4. An image suppression filter circuit according to this embodiment comprises a first high phase accuracy phase shifter 6, a second high phase accuracy phase shifter 7, a third high amplitude accuracy phase shifter 14 and a fourth high amplitude accuracy phase shifter 15, which are cascade-connected in two stages.

In this image suppression filter circuit, the first high phase accuracy phase shifter 6 receives an inphase input signal $I_{IN}$, and outputs a first output signal $V_I$ and a second output signal $V_Q$ whose phase is orthogonal to the first output signal $V_I$. The second high phase accuracy phase shifter 7 receives a quadrature input signal $Q_{IN}$ including a phase component substantially orthogonal to the inphase input signal $I_{IN}$, and outputs a third output signal $V_I$ and a fourth output signal $V_Q$ whose phase is orthogonal to the third output signal $V_I$.

The inphase input signal $I_{IN}$ and quadrature input signal $Q_{IN}$ shown in FIG. 6 correspond, for instance, to inphase output and quadrature output of a not shown former stage quadrature mixer, and become respectively the input signals $V_{IN}$ of the first and second high phase accuracy phase shifters 6 and 7.

The fourth output $V_Q$ output from the second high phase accuracy phase shifter 7 is subtracted from the first output signal $V_I$ output from the first high phase accuracy phase shifter 6 by a first subtracter 10, and this subtraction result is output as subtraction signal X1.

The second output signal $V_Q$ output from the first high phase accuracy phase shifter 6 and the third output signal $V_I$ output from the second high phase accuracy phase shifter 7 are added by a first adder 11 and this addition result is output as addition signal X2.

The subtraction signal X1 is input to the third high amplitude accuracy phase shifter 14, which outputs a fifth output signal $V_I$ having the substantially same component as the subtraction signal X1 and a sixth output signal $V_Q$ converted into a phase component substantially orthogonal to the fifth output signal $V_I$.

The addition signal X2 is input to the fourth high amplitude accuracy phase shifter 15, which outputs a seventh output signal $V_I$ having the substantially same phase component as the addition signal X2 and an eighth output signal $V_Q$ converted into a phase component substantially orthogonal to the seventh output signal $V_I$.

The eighth output signal $V_Q$ output from the fourth high amplitude accuracy phase shifter 15 is subtracted from the fifth output signal $V_I$ output from the third high amplitude accuracy phase shifter 8 by a second subtracter 12, and this subtraction result is an inphase output signal $I_{OUT}$.

The sixth output signal $V_Q$ output from the third high amplitude accuracy phase shifter 8 and the seventh output signal $V_I$ output from the fourth high amplitude accuracy phase shifter 15 are added by a second adder 13 and this addition result is a quadrature output signal.

The subtraction signal X1, addition signal X2, inphase output signal $I_{OUT}$, and quadrature output signal $Q_{OUT}$ of the image suppression filter circuit can be expressed by the following expressions:

$$X1 = e^{j(\pi/2)}[I_{IN}e^{-j(\pi/2)} + (Q_{IN}/\omega CR)] \quad (8)$$

$$X2 = (I_{IN}/\omega CR)e^{-j(\pi/2)} + Q_{IN} \quad (9)$$

$$I_{OUT} = X1e^{j\theta} - X2 = e^{j(\pi/2)}[I_{IN}\{e^{j(\theta-\pi/2)} + 1/(\omega CR)\} \quad (10)$$
$$\quad - Q_{IN}e^{-j(\pi/2)}\{e^{j(\theta-\pi/2)}/(\omega CR) + 1\}]$$

$$Q_{OUT} = X1 + X2e^{j\theta} = I_{IN}\{e^{j(\theta-\pi/2)}/(\omega CR) + 1\} \quad (11)$$
$$\quad - Q_{IN}e^{-j(\pi/2)}\{e^{j(\theta-\pi/2)} + 1/(\omega CR)\}$$

Nearer 90 degree is the phase θ, more removed is the image signal, and nearer 1 is the amplitude ratio of coefficient of inphase input signal $I_{IN}$ and quadrature input signal $Q_{IN}$, more removed is the image signal.

For instance, in case where ωCR is 1.2, from the expressions (8) and (9), the amplitude ratio (1/(1/ωCR)) of inphase input signal and quadrature input signal remains 1.2, with subtraction signal X1 and addition signal X2 which are output results of an image suppression filter circuit wherein the phase shifter comprises a single stage of the first high phase accuracy phase shifter 6 and the second high phase accuracy phase shifter 7. However, the phase difference of inphase input signal and quadrature input signal is 90 degrees.

On the other hand, the amplitude ratio in inphase output signal $I_{OUT}$ and quadrature output signal $Q_{OUT}$, which are output results of two stages of first high phase accuracy phase shifter 6, second high phase accuracy phase shifter 7 and third high amplitude accuracy phase shifter 14, fourth high amplitude accuracy phase shifter 15, as the image suppression filter circuit shown in FIG. 6, becomes 1.

While the phase difference Δφ in inphase output signal $I_{OUT}$ and quadrature output signal $Q_{OUT}$ can be calculated as follows from the expressions (10) and (11). Here, only inphase output signal $I_{OUT}$ is calculated using the expression (10), similarly, quadrature output signal $Q_{OUT}$ can also be calculated using the expression (11).

First, $\{e^{j(\theta-\pi/2)} + 1/(\omega CR)\}$ multiplied by the inphase input signal $I_{IN}$ can be expressed as follows.

$$\cos(\theta - \pi/2) + j\sin(\theta - \pi/2) + 1/(\omega CR) = \quad (12)$$
$$\{\cos(\theta - \pi/2) + 1/(\omega CR)\} + j\sin(\theta - \pi/2) = A + jB$$

From this, this phase φ1 can be expressed as follows:

$$\phi1 = \tan^{-1}(B/A) \quad (13)$$

In the expression (12), given θ=2 tan$^{-1}$(1/(ωCR)),=−5.6 is obtained by substituting values.

On the other hand, $\{e^{j(\theta-\pi/2)}/(\omega CR)+1\}$ multiplied by the quadrature output signal $Q_{IN}$ can be expressed as follows.

$$\cos(\theta - \pi/2)/(\omega CR) + j\sin(\theta - \pi/2)/(\omega CR) + 1 = \quad (14)$$
$$\{1 + \cos(\theta - \pi/2)/-(\omega CR)\} + j\sin(\theta - \pi/2)/(\omega CR) = C + jd$$

From this, this phase φ2 can be expressed as follows:

$$\phi2 = \tan^{-1}(D/C) \quad (15)$$

In the expression (15), given θ=2 tan$^{-1}$(1/(ωCR)), φ2=−4.7° is obtained by substituting values.

Hence, the phase difference Δφ=−0.9° becomes extremely near 0. This is substantially improved as compared with the phase difference Δφ=π/2−θ=π/2−2 tan$^{-1}$(1/(ωCR))=−10.4° in case of using a single stage of high amplitude accuracy phase shifter. The product of CR must be the same value between the phase filters 6, 7 and 14, 15, but respective values of C and R may be changed between the phase filters 6, 7 and 14, 15.

From the aforementioned results, the phase accuracy is −0.9° and the amplitude accuracy is 1, by cascade connection of high phase accuracy phase shifter and high amplitude accuracy phase shifter as in the image suppression filter circuit according to the present invention, allowing to realize a high accuracy over a broadband.

A high precision of phase accuracy and amplitude accuracy for a still broader band can be realized, by increasing the number of connection stages to be cascade connected.

Figure 7:
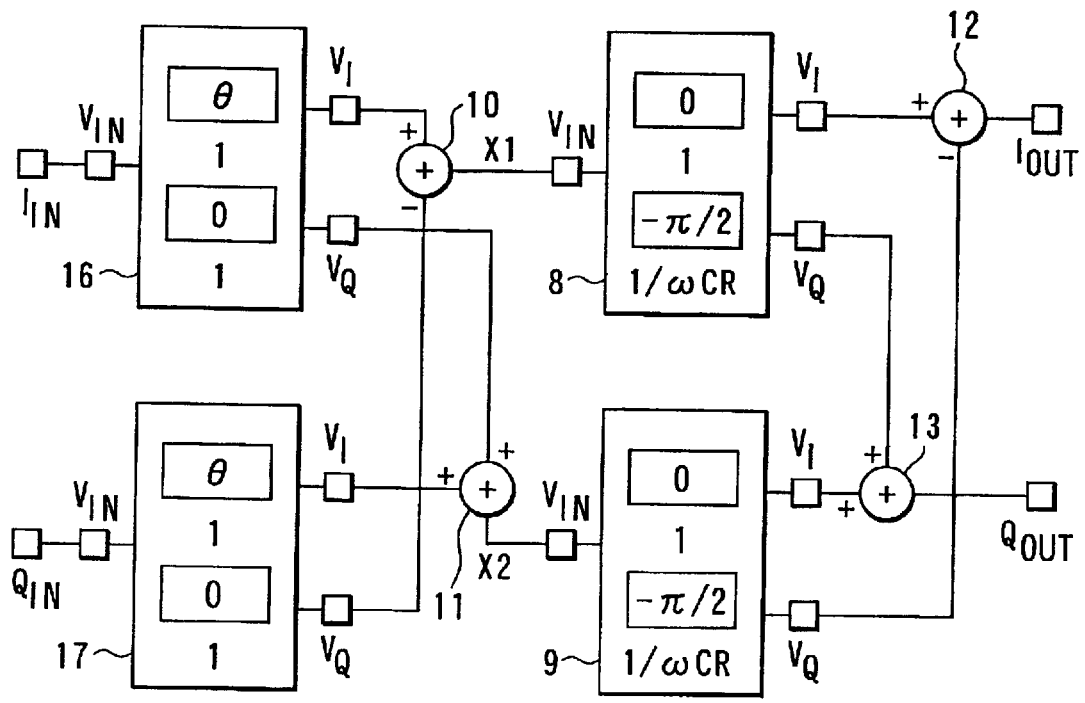
FIG. 7 is a circuit diagram of a broadband and high accuracy image suppression filter circuit according to a third embodiment of the present invention.

Next, the image suppression filter circuit according to a third embodiment of the present invention will be shown in FIG. 7 using the block diagram shown in FIGS. 3 and 4. An image suppression filter circuit according to this embodiment comprises a first high amplitude accuracy phase shifter 16, a second high amplitude accuracy phase shifter 17, a third high amplitude accuracy phase shifter 8, and a fourth high phase accuracy phase shifter 9, which are cascade-connected in two stages.

In this image suppression filter circuit, the first high amplitude accuracy phase shifter 16 receives an inphase input signal $I_{IN}$, and outputs a first output signal $V_I$ and a second output signal $V_Q$ having a phase component substantially orthogonal to the first output signal $V_I$. The second high amplitude accuracy phase shifter 17 receives a quadrature input signal $Q_{IN}$, and outputs a third output signal $V_I$ and a fourth output signal $V_Q$ converted into a phase component substantially orthogonal to the third output signal $V_I$.

The inphase input signal $I_{IN}$ and quadrature input signal $Q_{IN}$ shown in FIG. 7 correspond, for instance, to inphase output and quadrature output of a former stage quadrature mixer (not shown), and become respectively the input signal $V_{IN}$ of the first high amplitude accuracy phase shifter 16 and the input signal $V_{IN}$ of the second high phase accuracy phase shifter 17.

The fourth output $V_Q$ output from the second high amplitude accuracy phase shifter 17 is subtracted from the first output signal $V_I$ output from the second high amplitude accuracy phase shifter 17 by a first subtracter 10, and this subtraction result is output as subtraction signal X1.

The second output signal $V_Q$ output from the first high amplitude accuracy phase shifter 16 and the third output signal $V_I$ output from the second high amplitude accuracy phase shifter 17 are added by a first adder 11 and this addition result is output as addition signal X2.

The subtraction signal X1 is input to the third high phase accuracy phase shifter 8, which outputs a fifth output signal $V_I$ and a sixth output signal $V_Q$ having a phase component substantially orthogonal to the fifth output signal $V_I$.

The addition signal X2 is input to the fourth high phase accuracy phase shifter 9, which outputs a seventh output signal $V_I$ and an eighth output signal $V_Q$ having a phase component substantially orthogonal to the seventh output signal $V_I$.

The eighth output signal $V_Q$ output from the fourth high phase accuracy phase shifter 9 is subtracted from the fifth output signal $V_I$ output from the third high phase accuracy phase shifter 8 by a second subtracter 12, and this subtraction result is an inphase output signal $I_{OUT}$.

The sixth output signal $V_Q$ output from the third high phase accuracy phase shifter 8 and the seventh output signal $V_I$ output from the fourth high phase accuracy phase shifter 9 are added by a second adder 13 and this addition result is a quadrature output signal $Q_{OUT}$.

The subtraction signal X1, addition signal X2, inphase output signal $I_{OUT}$, and quadrature output signal $Q_{OUT}$ of the thus constituted image suppression filter circuit can be expressed by the following expressions:

$$X1 = I_{IN} e^{j\theta} - Q_{IN} \quad (16)$$

$$X2 = I_{IN} + Q_{IN} e^{j\theta} \quad (17)$$

$$I_{OUT} = \quad (18)$$
$$e^{j(\pi/2)}[X1 e^{-j(\pi/2)} + (X2/\omega CR)] = e^{j(\pi/2)}[I_{IN}\{e^{j(\theta-\pi/2)} + 1/(\omega CR)\} -$$
$$Q_{IN} e^{-j(\pi/2)}\{e^{j(\theta-\pi/2)}/(\omega CR) + 1\}]$$

$$Q_{OUT} = (X1/\omega CR)e^{-j(\pi/2)} + X2 = \quad (19)$$
$$I_{IN}\{e^{j(\theta-\pi/2)}/(\omega CR) + 1\} - Q_{IN} e^{-j(\pi/2)}\{e^{j(\theta-\pi/2)} + 1/(\omega CR)\}$$

Here, $\theta = 2\tan^{-1}(1/(\omega CR))$ is represented.

Nearer 90 degree is the phase $\theta$, more removed is the image signal, and nearer 1 is the amplitude ratio of coefficient of inphase input signal $I_{IN}$ and quadrature input signal $Q_{IN}$, more removed is the image signal.

For instance, in case where $\omega CR$ is 1.2, from the expressions (16) and (17), the phase error of inphase output signal and quadrature output signal is $\Delta\phi = \pi/2 - \theta = \pi/2 - 2\tan^{-1}(1/(\omega CR)) = -10.4°$, with subtraction signal X1 and addition signal X2 which are output results of an image suppression filter circuit wherein the phase shifter comprises a single stage of the first high amplitude accuracy phase shifter 16 and the second high amplitude accuracy phase shifter 17. There is no amplitude difference of the coefficients between inphase input signal and quadrature input signal.

On the other hand, the amplitude ratio in inphase output signal $I_{OUT}$ and quadrature output signal $Q_{OUT}$ which are output results of two stages of first high amplitude accuracy phase shifter 16, second high amplitude accuracy phase shifter 17 and third high phase accuracy phase shifter 8, fourth high phase accuracy phase shifter 9, as the image suppression filter circuit shown in FIG. 6, becomes 1.

While the phase difference $\Delta\phi$ in in inphase output signal $I_{OUT}$ and quadrature output signal $Q_{OUT}$ can be calculated as follows from the expressions (18) and (19). Here, only inphase output signal $I_{OUT}$ is calculated using the expression (18), similarly, quadrature output signal $Q_{OUT}$ can also be calculated using the expression (19).

First, $\{e^{j(\theta-\pi/2)} + 1/(\omega CR)\}$ multiplied by the inphase input signal $I_{IN}$ can be expressed as follows.

$$\cos(\theta - \pi/2) + j\sin(\theta - \pi/2) + 1/(\omega CR) = \quad (20)$$
$$\{\cos(\theta - \pi/2) + 1/(\omega CR)\} + j\sin(\theta - \pi/2) = A + jB$$

From this, this phase $\phi 1$ can be expressed as follows:

$$\phi 1 = \tan^{-1}(B/A) \quad (21)$$

In the expression (21), given $\theta = 2\tan^{-1}(1/(\omega CR))$, $\phi 1 = -5.6$ is obtained by substituting values.

On the other hand, $\{e^{j(\theta-\pi/2)} + 1/(\omega CR) + 1\}$ multiplied by the quadrature output signal $Q_{IN}$ can be expressed as follows:

$$\cos(\theta - \pi/2)/(\omega CR) + j\sin(\theta - \pi/2)/(\omega CR) + 1 = \quad (22)$$
$$\{1 + \cos(\theta - \pi/2)/(\omega CR)\} + j\sin(\theta - \pi/2)/(\omega CR) = C + jD$$

From this, this phase $\phi 2$ can be expressed as follows:

$$\phi 2 = \tan^{-1}(D/C) \quad (23)$$

In the expression (22), given $\theta = 2\tan^{-1}(1/(\omega CR))$, $\phi 2 = -4.7°$ is obtained by substituting values.

Hence, the phase difference becomes $\Delta\phi = -0.9°$.

On the other hand, the phase error of inphase signal and quadrature signal in case of using a single stage of high amplitude accuracy phase shifter becomes $\Delta\phi = \pi/2 - \theta = \pi/2 - 2\tan^{-1}(1/(\omega CR)) = -10.4°$, the phase accuracy of the image suppression filter circuit shown in this embodiment is substantially improved.

Therefore, it is evident that the phase accuracy and the amplitude accuracy can be made more precise over a broadband, using an image suppression filter circuit cascade-connecting high phase accuracy phase shifter and high amplitude accuracy phase shifter.

A high precision of phase accuracy and amplitude accuracy for a still broader band can be realized, by increasing the number of connection stages to be cascade connected.

Figure 8:
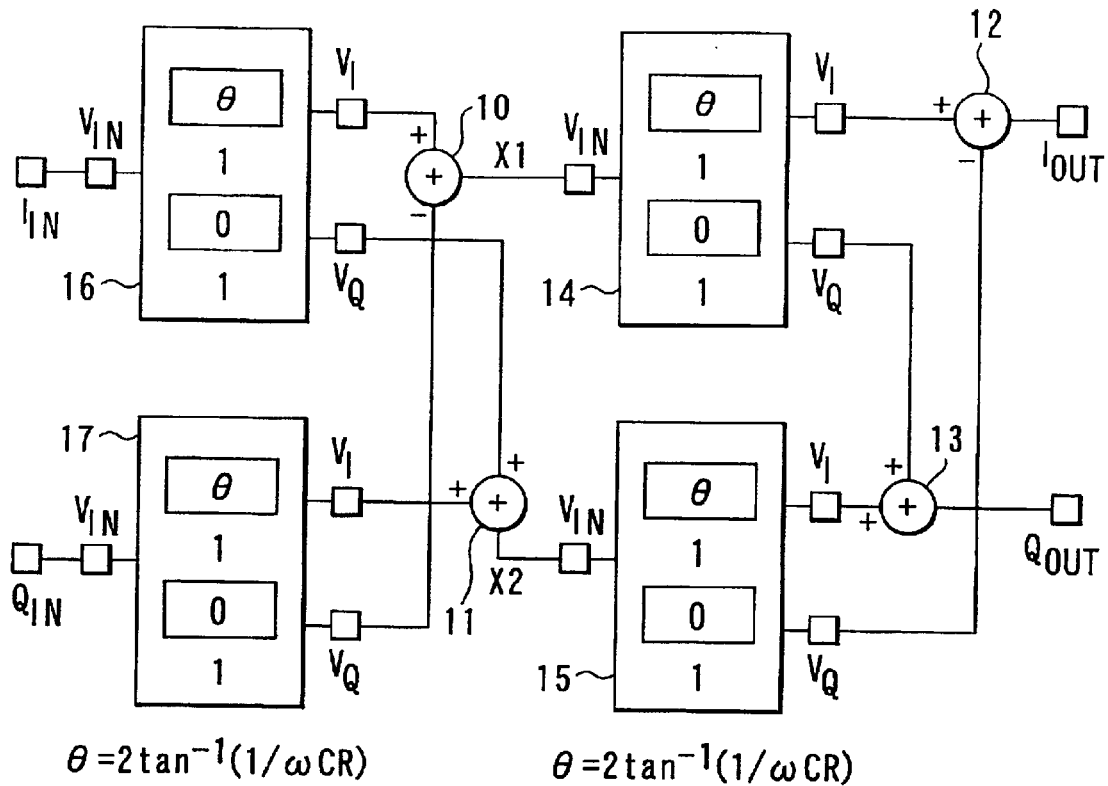
FIG. 8 is a circuit diagram of a broadband and high accuracy image suppression filter circuit according to a fourth embodiment of the present invention.

Next, FIG. 8 is a circuit diagram of an image suppression filter circuit according to a fourth embodiment of the present invention using the block diagram shown in FIGS. 3 and 4. An image suppression filter circuit according to this embodiment comprises a first high amplitude accuracy phase shifter 16, a second high amplitude accuracy phase shifter 17, a third high amplitude accuracy phase shifter 14, and a fourth high amplitude accuracy phase shifter 15, which are cascade-connected in two stages.

In this image suppression filter circuit, the first high amplitude accuracy phase shifter 16 receives an inphase input signal $I_{IN}$, and outputs a first output signal $V_I$ and a second output signal $V_Q$ converted into a phase component substantially orthogonal to the first output signal $V_I$. The second high amplitude accuracy phase shifter 17 receives a quadrature input signal $Q_{IN}$ including a phase component substantially orthogonal to the inphase input signal $I_{IN}$, and outputs a third output signal $V_I$ and a fourth output signal $V_Q$ converted into a phase component substantially orthogonal to the third output signal $V_I$.

The inphase input signal $I_{IN}$ and quadrature input signal $Q_{IN}$ shown in FIG. 8 correspond, for instance, to inphase output and quadrature output of a former stage quadrature mixer (not shown), and become respectively the input signal $V_{IN}$ of the first high amplitude accuracy phase shifter 16 and the input signal $V_{IN}$ of the second high amplitude accuracy phase shifter 17.

The fourth output $V_Q$ output from the second high amplitude accuracy phase shifter 17 is subtracted from the first output signal $V_I$ output from the first high amplitude accuracy phase shifter 16 by a first subtracter 10, and this subtraction result is output as subtraction signal X1.

The second output signal $V_Q$ output from the first high amplitude accuracy phase shifter 16 and the third output signal $V_I$ output from the second high amplitude accuracy phase shifter 17 are added by a first adder 11 and this addition result is output as addition signal X2.

The subtraction signal X1 is input to the third high amplitude accuracy phase shifter 14, which outputs a fifth output signal $V_I$ and a sixth output signal $V_Q$ converted into a phase component substantially orthogonal to the fifth output signal $V_I$.

The addition signal X2 is input to the fourth high amplitude accuracy phase shifter 15, which outputs a seventh output signal $V_I$ and an eighth output signal $V_Q$ having a phase component substantially orthogonal to the seventh output signal $V_I$.

The eighth output signal $V_Q$ output from the fourth high amplitude accuracy phase shifter 15 is subtracted from the fifth output signal $V_I$ output from the third high amplitude accuracy phase shifter 14 by a second subtracter 12, and this subtraction result is an inphase output signal $I_{OUT}$.

The sixth output signal $V_Q$ output from the third high amplitude accuracy phase shifter 14 and the seventh output signal $V_I$ output from the fourth high amplitude accuracy phase shifter 15 are added by a second adder 13 and this addition result is an quadrature output signal $Q_{OUT}$.

The subtraction signal X1, addition signal X2, inphase output signal $I_{OUT}$, and quadrature output signal $Q_{OUT}$ of the image suppression filter circuit can be expressed by the following expressions:

$$X1 = I_{IN} e^{j\theta} - Q_{IN} \quad (24)$$

$$X2 = I_{IN} + Q_{IN} e^{j\theta} \quad (25)$$

$$I_{OUT} = X1 e^{j\theta} - X2 = 2 e^{j(\theta + \pi/2)} [I_{IN} \sin\theta + Q_{IN} e^{j(\pi/2)}] \quad (26)$$

$$Q_{OUT} = X1 + X2 e^{j\theta} = 2 e^{j\theta} [I_{IN} + Q_{IN} \sin\theta e^{j(\pi/2)}] \quad (27)$$

Here, $\theta = 2 \tan^{-1}(1/(\omega CR))$ is represented.

Nearer 90 degree is the phase $\theta$, more removed is the image signal, and nearer 1 is the amplitude ratio of coefficient of inphase input signal $I_{IN}$ and quadrature input signal $Q_{IN}$, more removed is the image signal.

For instance, in case where $\omega CR$ is 1.2, from the expressions (8) and (9), as mentioned above, the amplitude ratio in case of using a single stage of high phase accuracy phase shifter is 1.2, and the phase difference is 0°. Thus, the amplitude ratio slips considerably, not allowing to obtain broadband characteristics.

On the other hand, the amplitude ratio becomes sin $\theta = 0.983$, as obvious from the expressions (26) and (27) in inphase output signal $I_{OUT}$ and quadrature output signal $Q_{OUT}$ which are output results of two stages of first high amplitude accuracy phase shifter 16, second high amplitude accuracy phase shifter 17, third high amplitude accuracy phase shifter 14, and fourth high amplitude accuracy phase shifter 15, as the image suppression filter circuit shown in FIG. 8. This is substantially equal to the reciprocal of the amplitude ratio of 1.017 of the image suppression filter circuit of the first embodiment wherein the high phase accuracy phase shifters are cascade-connected in two stages.

While the phase of the inphase input signal $I_{IN}$ is $e^{j0}(=1)$, the quadrature input signal $Q_{IN}$ being $e^{j(\pi/2)}$, 90° phase is performed precisely. Therefore, it is evident that the phase accuracy and the amplitude accuracy can be realized precisely over a broadband also in case of cascade connecting high amplitude accuracy phase shifter.

Figure 9:
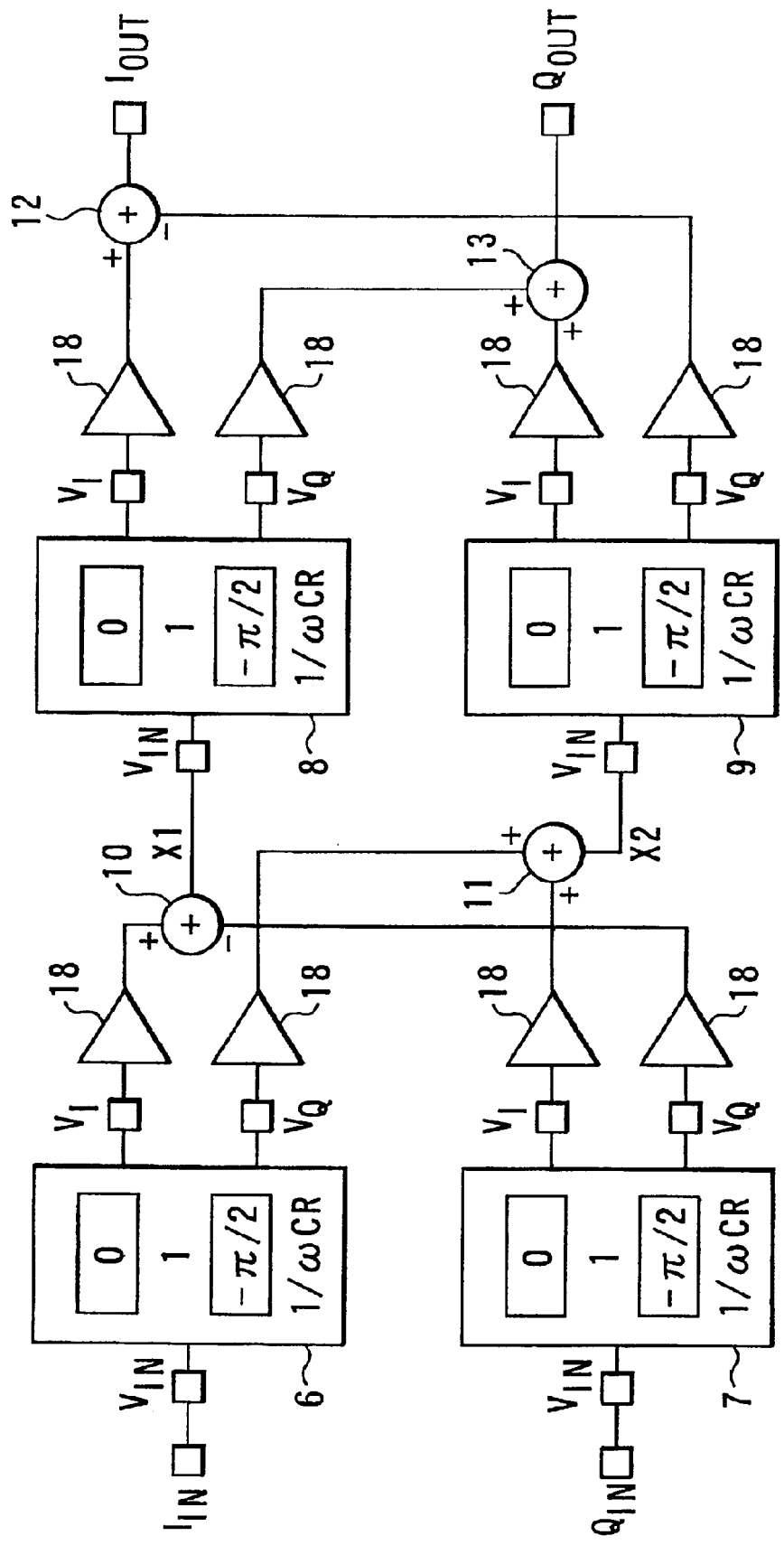
FIG. 9 is a circuit diagram of a broadband and high accuracy image suppression filter circuit according to a fifth embodiment of the present invention.

FIG. 9 is a circuit diagram of an image suppression filter circuit according to a fifth embodiment of the present invention.

In this embodiment, the first output signal $V_I$ output from the first high phase accuracy phase shifter 6 in the broadband and high accuracy image suppression filter circuit described for the first embodiment is input to the first subtracter 10 through a buffer circuit 18, and the fourth output signal $V_Q$ output from the second high phase accuracy phase shifter 7 is input to the first subtracter 10 and subtracted through the buffer circuit 18.

The second output signal $V_Q$ output from the first high phase accuracy phase shifter 6 is input to the first adder 11 through the buffer circuit 18, and the third output signal $V_I$ output from the second high phase accuracy phase shifter 7 is input to the first adder 11 through the buffer circuit 18, and added.

The fifth output signal $V_I$ output from the third high phase accuracy phase shifter 8 is input to the second subtracter 12 through the buffer circuit 18, and the eighth output signal $V_Q$ output from the fourth high phase accuracy phase shifter 9 is input to the second subtracter 12 and subtracted through the buffer circuit 18.

The sixth output signal $V_Q$ output from the third high phase accuracy phase shifter 8 is input to the second adder 13 through the buffer circuit 18, and the seventh output signal $V_I$ output from the fourth high phase accuracy phase shifter 9 is input to the second adder 13 through the buffer circuit 18, and added.

The buffer circuit 18 includes a voltage current converter, and addition and subtraction are performed by current addition and current subtraction using output current of the buffer circuit 18.

Though not shown in FIG. 9, after current subtraction and current addition in the first subtracter 10 and the first adder 11, the subtraction signal X1 and addition signal X2 thereof are converted into voltage using, for instance, a resistor and input to the third high phase accuracy phase shifter 8 and fourth high phase accuracy phase shifter 9.

Such a broadband high accuracy image suppression filter circuit can further increase the precision by increasing the number of connection stages.

Here, the buffer circuit 18 is used, because the characteristics of the high phase accuracy phase shifter require that the output side viewed from $V_I$, $V_Q$ output terminals is high impedance as a condition, as shown in FIG. 1A. Further, the noise characteristic deterioration can be reduced by compensating the loss of the high phase accuracy phase shifter with this buffer circuit 18.

Figure 10:
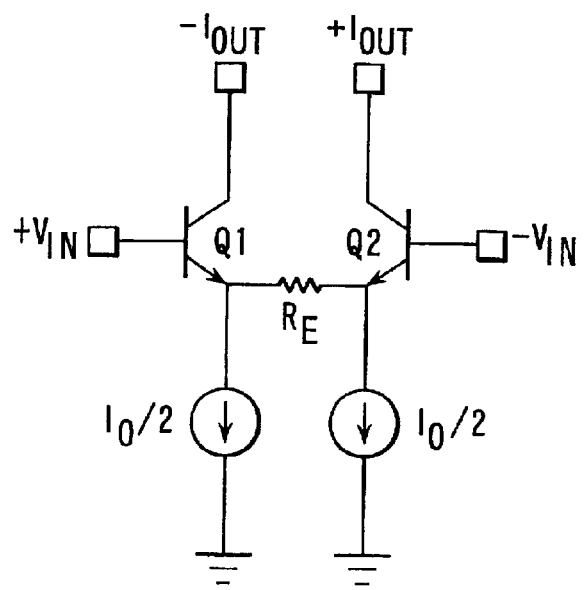
FIG. 10 is a buffer circuit diagram according to a linearized operation circuit.

This buffer circuit 18 can be realized simply by a linearized differential circuit which generally used shown, for instance, in FIG. 10. The emitter electrodes of transistors Q1 and Q2 are connected by a resistor RE. Respectively, currents $-I_{OUT}$ and $+I_{OUT}$ are output from the collectors, and base voltages $+V_{IN}$ and $-V_{IN}$ are input to the bases.

Figure 11:
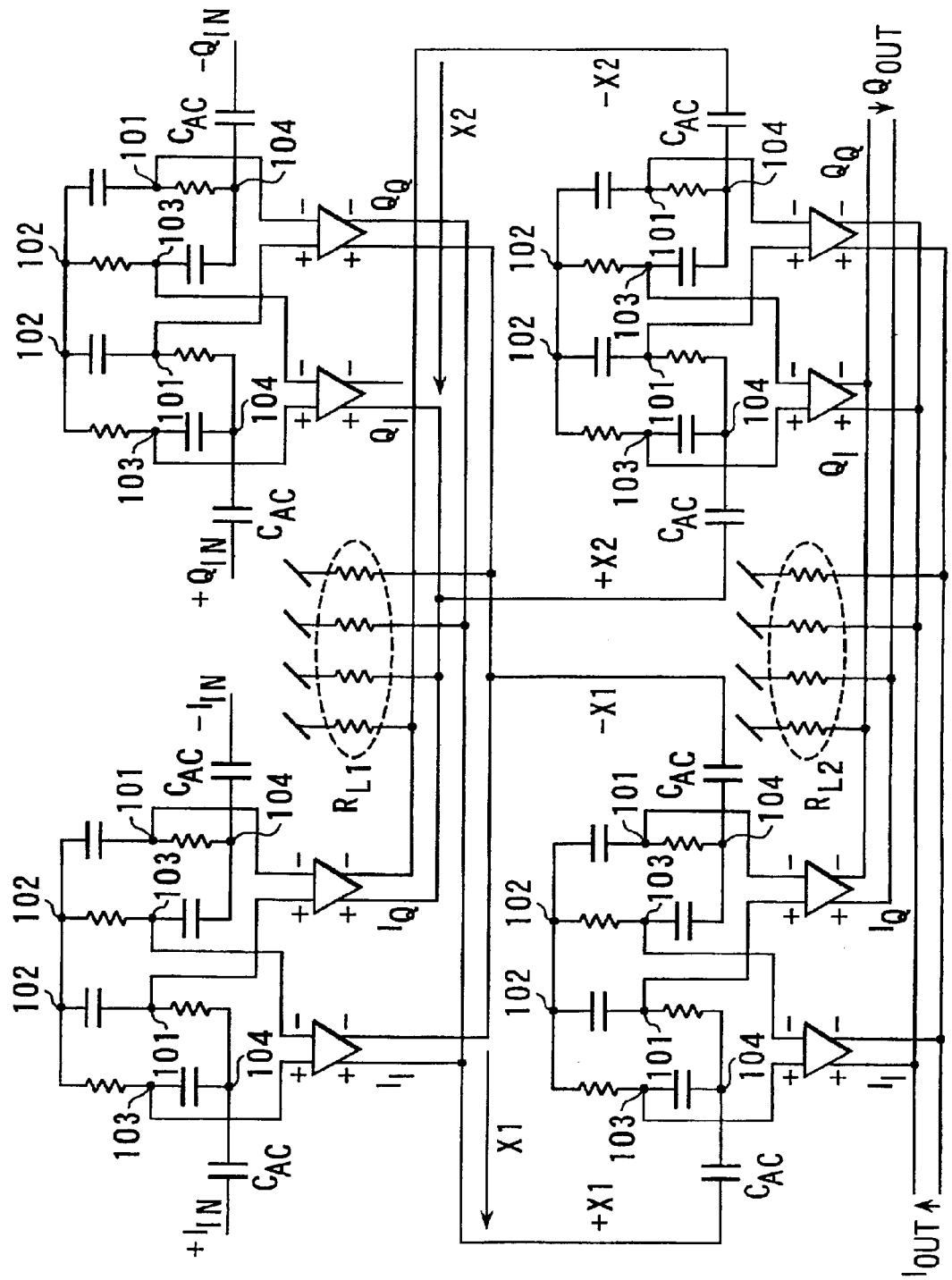
FIG. 11 is a circuit diagram appropriate for the integration of a broadband and high accuracy image suppression filter circuit according to the fifth embodiment of the present invention.

FIG. 11 is a circuit diagram showing a concrete example of image suppression filter circuit shown in FIG. 9.

The configuration of the image suppression filter circuit shown in this circuit diagram is basically similar to one shown in FIG. 9, however, a differential circuit configuration appropriate for integration is used.

In FIG. 11, $C_{AC}$ represents an AC coupling capacitor, used for removing direct current component. $R_{L1}$ and $R_{L2}$ represent load resistors used for converting current into voltage. The phase shifter used in each stage employs a high phase accuracy phase shifter shown in FIG. 9.

As shown in FIG. 11, inphase input signals $+I_{IN}$ and $-I_{IN}$ are input to the left upper stage, and quadrature input signals $+Q_{IN}$ and $-Q_{IN}$ are input to the right upper stage.

The first output signal $I_I$ is connected to the fourth output signal $-Q_Q$ to subtract it. The second output signal $I_Q$ is connected to the third output signal $Q_I$ to add it. In this way, subtraction signal X1 and addition signal X2 are formed respectively.

The fifth output signal $I_I$ is connected to the eighth output signal $Q_Q$ to subtract it. The sixth output signal $I_Q$ is connected to the seventh output signal $Q_I$ to add it. Thus, the output signals $I_{OUT}$ and $Q_{OUT}$ are obtained.

Though not shown in FIG. 11, this broadband and high accuracy image suppression filter circuit can further increase the precision by increasing the number of connection stages.

Figure 12:
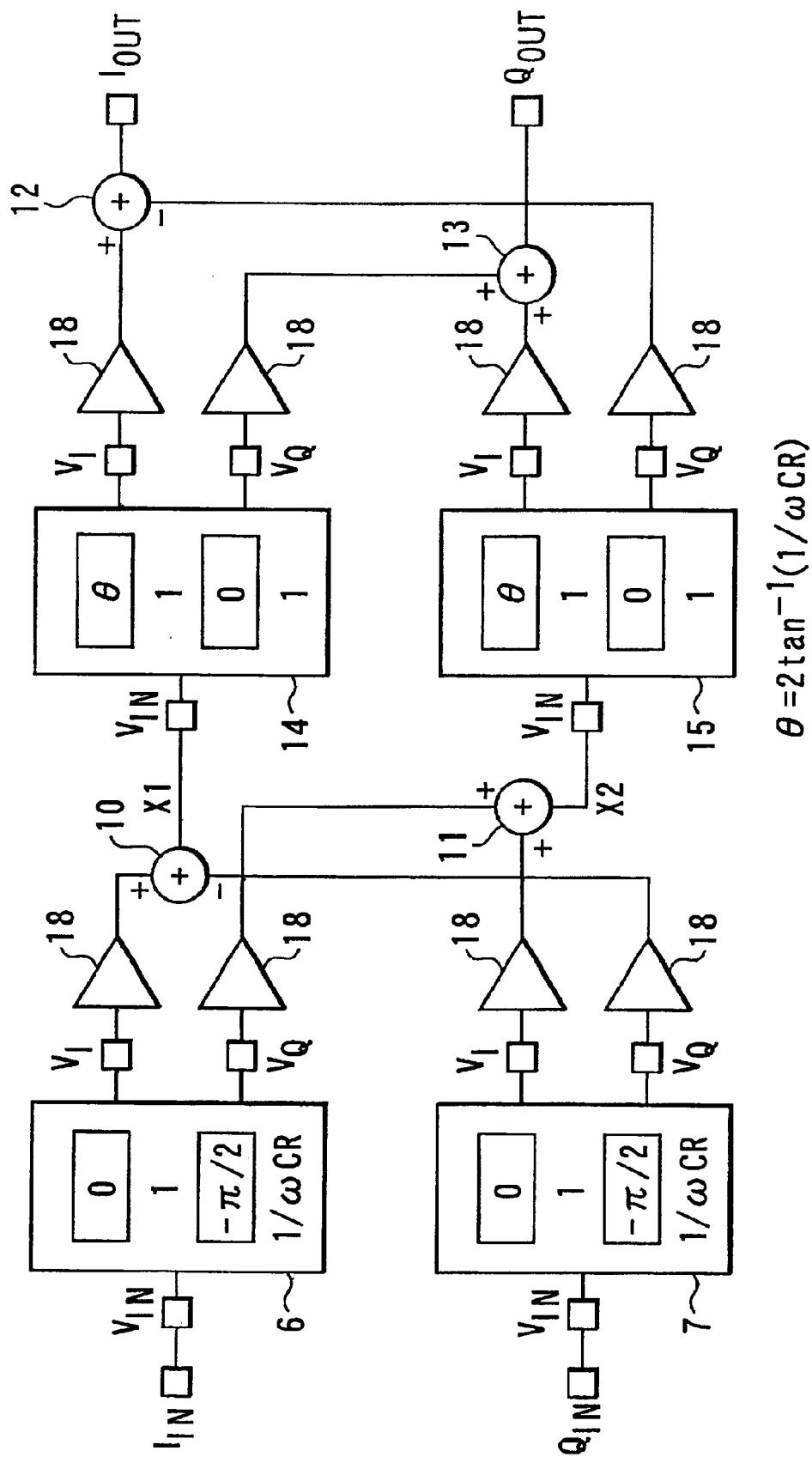
FIG. 12 is a circuit diagram of a broadband and high accuracy image suppression filter circuit according to a sixth embodiment of the present invention.

FIG. 12 is a circuit diagram of an image suppression filter circuit according to a sixth embodiment of the present invention.

In this embodiment, the first output signal $V_I$ output from the first high phase accuracy phase shifter 6 in the broadband and high accuracy image suppression filter circuit described for the second embodiment is input to the first subtracter 10 through a buffer circuit 18, and the fourth output signal $V_Q$ output from the second high phase accuracy phase shifter 7 is input to the first subtracter 10 and subtracted through the buffer circuit 18.

The second output signal $V_Q$ output from the first high phase accuracy phase shifter 6 is input to the first adder 11 through the buffer circuit 18, and the third output signal $V_I$ output from the second high phase accuracy phase shifter 7 is input to the first adder 11 through the buffer circuit 18, and added.

The fifth output signal $V_I$ output from the third high amplitude accuracy phase shifter 14 is input to the second subtracter 12 through the buffer circuit 18, and the eighth output signal $V_Q$ output from the fourth high amplitude accuracy phase shifter 15 is input to the second subtracter 12 and subtracted through the buffer circuit 18.

The sixth output signal $V_Q$ output from the third high amplitude accuracy phase shifter 14 is input to the second adder 13 through the buffer circuit 18, and the seventh output signal $V_I$ output from the fourth high amplitude accuracy phase shifter 15 is input to the second adder 13 through the buffer circuit 18, and added.

The buffer circuit 18 includes a voltage current converter, and addition and subtraction are performed by current addition and current subtraction using output current of the buffer circuit 18.

Though not shown in FIG. 12, after current subtraction and current addition in the first subtracter 10 and the first adder 11, the subtraction signal X1 and addition signal X2 thereof are converted into voltage using, for instance, a resistor and input to the third high amplitude accuracy phase shifter 14 and fourth high amplitude accuracy phase shifter 15.

Such a broadband and high accuracy image suppression filter circuit can further increase the precision by increasing the number of connection stages.

In the image suppression filter circuit of this embodiment, the buffer circuit is used for two following reasons. First, the characteristics of the high phase accuracy phase shifter described in FIG. 1C require that the output side viewed from $V_I$ and $V_Q$ output terminals is high impedance as a condition; second, because the characteristics of the high amplitude accuracy phase shifter described in FIG. 2B require that the output side viewed from $V_I$ output terminal is high impedance as a condition.

Further, because the noise characteristic deterioration can be reduced by compensating the loss of the high phase accuracy phase shifter and high amplitude accuracy phase shifter, namely by affording gain to the buffer circuit 18.

This buffer circuit 18 can be realized simply by a linearized differential circuit which generally used as shown, for instance, in FIG. 10.

The same effects can be obtained by the configuration of the third embodiment having a high amplitude accuracy phase shifter as the first stage and a high phase accuracy phase shifter as the subsequent stage.

Figure 13:
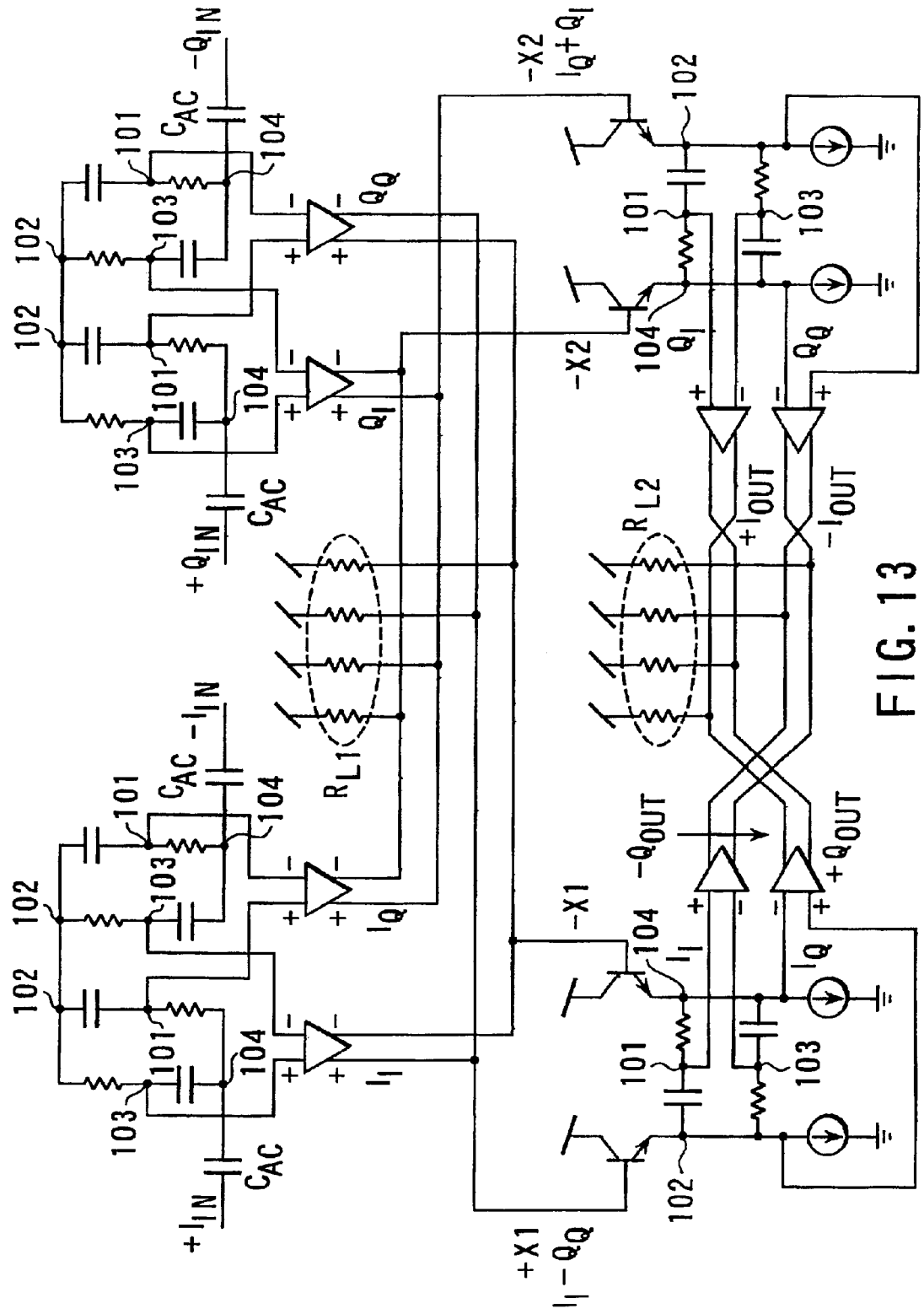
FIG. 13 is a circuit diagram appropriate for the integration of a broadband and high accuracy image suppression filter circuit according to the sixth embodiment of the present invention.

FIG. 13 is a circuit diagram showing a concrete example of broadband image suppression filter circuit shown in FIG. 12. The configuration is basically similar to the configuration of FIG. 11, however, a differential circuit configuration appropriate for circuit integration is used.

In FIG. 13, $C_{AC}$ represents an AC coupling capacitor, used for removing direct current component. $R_{L1}$ and $R_{L2}$ represent load resistor used for converting current into voltage.

The phase shifter to be used in first stage employs a high phase accuracy phase shifter shown in FIG. 1A and the phase shifter to be used in subsequent stage employs a high amplitude accuracy phase shifter shown in FIG. 2A.

As shown in FIG. 13, inphase input signals $+I_{IN}$, $-I_{IN}$ are input to the left upper stage, and quadrature input signals $+Q_{IN}$ and $-Q_{IN}$ are input to the right upper stage.

The first output signal $I_I$ is connected to the fourth output signal $Q_Q$ to subtract it. The third output signal $I_Q$ is connected to the third output signal $Q_I$ to add it. In this way, subtraction signal $X1=I_I-Q_Q$ and the addition signal $X2=I_Q+Q_I$ are obtained respectively.

The fifth output signal $I_I$ is connected to the eighth output signal $Q_Q$ to subtract it. The sixth output signal $I_Q$ is connected to the seventh output signal $Q_I$ to add it. Thus, the output signals IOUT and QOUT are obtained.

Though not shown in FIG. 13, this broadband and high accuracy image suppression filter circuit can further increase the precision by increasing the number of connection stages.

Similar effects can be obtained by the configuration of the image suppression filter circuit of the third embodiment having a high phase accuracy phase shifter as the first stage and a high amplitude accuracy phase shifter as the subsequent stage.

Figure 14:
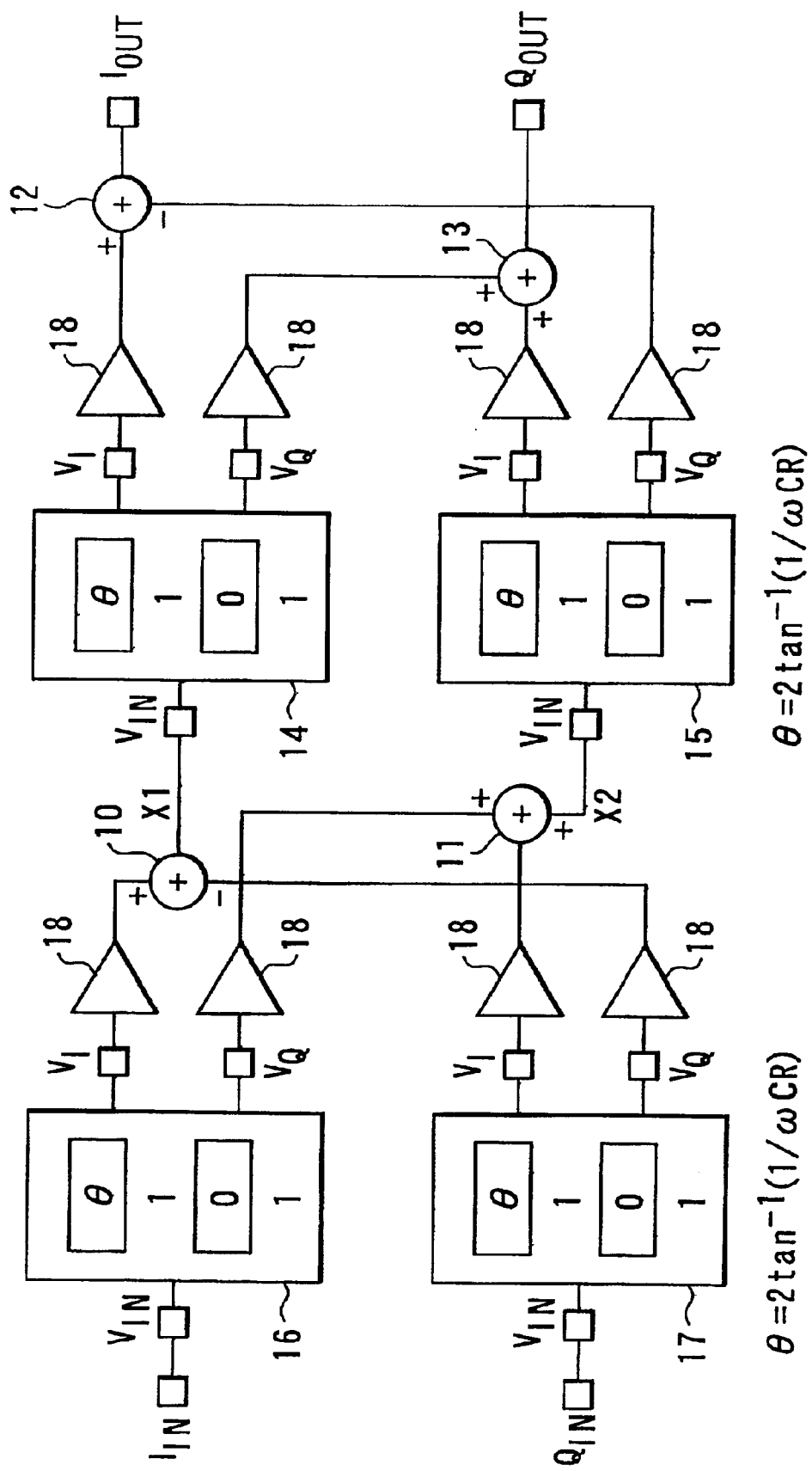
FIG. 14 is a circuit diagram of a broadband and high accuracy image suppression filter circuit according to a seventh embodiment of the present invention.

FIG. 14 is a circuit diagram of an image suppression filter circuit according to a seventh embodiment of the present invention. In this embodiment, the first output signal $V_I$ output from the first high amplitude accuracy phase shifter 16 in the broadband and high accuracy image suppression filter circuit described for the fourth embodiment is input to the first subtracter 10 through a buffer circuit 18, and the fourth output signal $V_Q$ output from the second high amplitude accuracy phase shifter 17 is input to the first subtracter 10 and subtracted through the buffer circuit 18.

The second output signal $V_Q$ output from the first high amplitude accuracy phase shifter 16 is input to the first adder 11 through the buffer circuit 18, and the third output signal $V_I$ output from the second high amplitude accuracy phase shifter 17 is input to the first adder 11 through the buffer circuit 18, and added.

The fifth output signal $V_I$ output from the third high amplitude accuracy phase shifter 14 is input to the second subtracter 12 through the buffer circuit 18, and the eighth output signal $V_Q$ output from the fourth high amplitude accuracy phase shifter 15 is input to the second subtracter 12 and subtracted through the buffer circuit 18.

The sixth output signal $V_Q$ output from the third high amplitude accuracy phase shifter 14 is input to the second adder 13 through the buffer circuit 18, and the seventh output signal $V_I$ output from the fourth high amplitude accuracy phase shifter 15 is input to the second adder 13 through the buffer circuit 18, and added.

The buffer circuit 18 includes a voltage current converter, and addition and subtraction are performed by current addition and current subtraction using output current of the buffer circuit 18.

Though not shown in FIG. 14, after current subtraction and current addition in the first subtracter 10 and the first adder 11, the subtraction signal X1 and addition signal X2 thereof are converted into voltage using, for instance, a resistor and input to the third high amplitude accuracy phase shifter 14 or fourth high amplitude accuracy phase shifter 15.

Such a broadband and high accuracy image suppression filter circuit can further increase the precision by increasing the number of connection stages.

In the image suppression filter circuit of this embodiment, the buffer circuit 18 is used mainly because, the characteristics of the high amplitude accuracy phase shifter described in FIG. 2B require that the output side viewed from $V_I$ output terminal is high impedance as a condition. Further, this is because the noise characteristic deterioration can be reduced by compensating the loss of the high amplitude accuracy phase shifter, namely by affording gain to the buffer circuit 18.

This buffer circuit 18 can be realized simply by a linearized differential circuit which generally used as shown, for instance, in FIG. 10.

Figure 15:
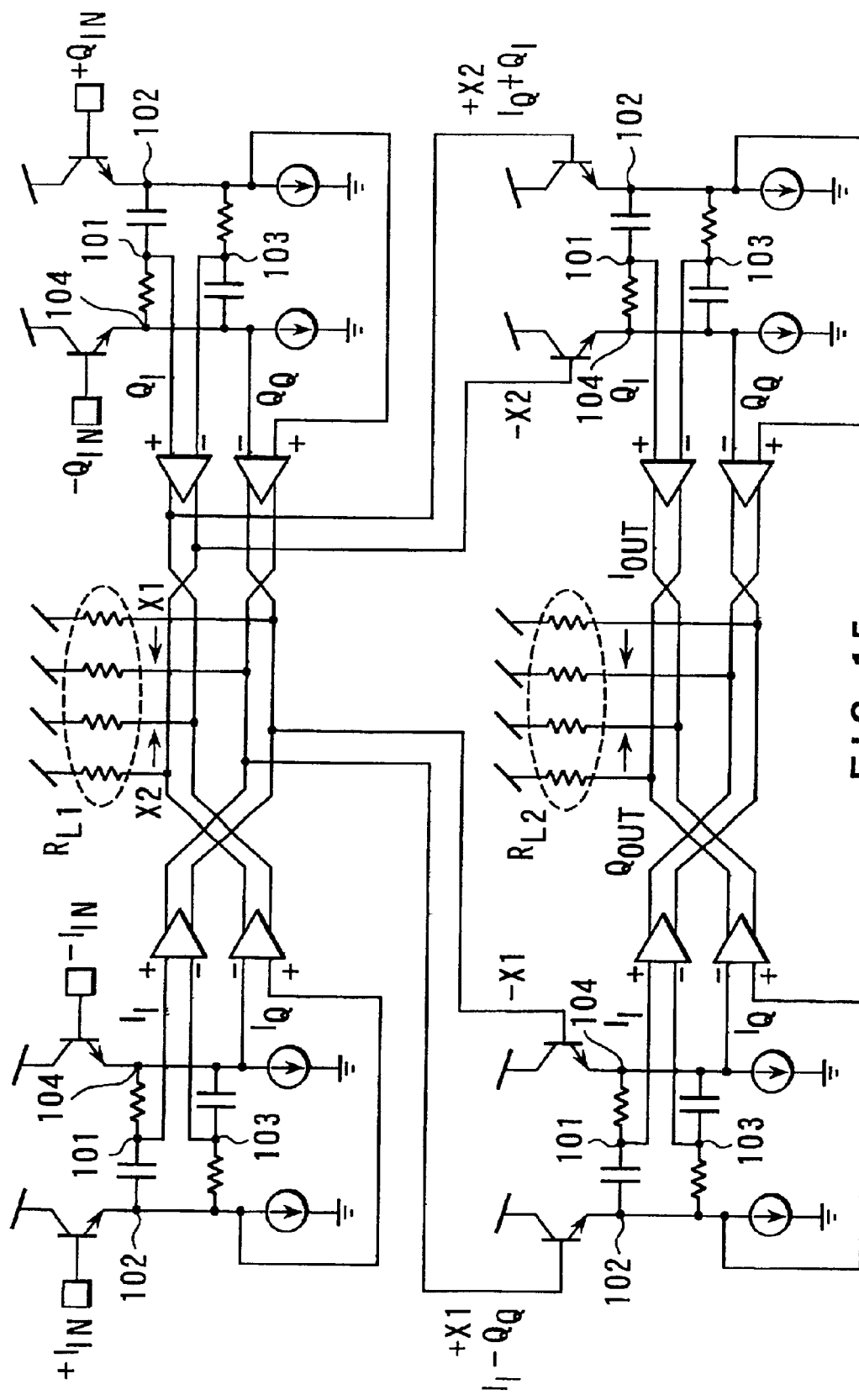
FIG. 15 is a circuit diagram appropriate for the integration of a broadband and high accuracy image suppression filter circuit according to the seventh embodiment of the present invention.

FIG. 15 is a circuit diagram showing a concrete example of broadband and high accuracy image suppression filter circuit shown in FIG. 14. The configuration is basically similar to the configuration of FIG. 14, however, a differential circuit configuration appropriate for circuit integration is used.

In FIG. 15, $R_{L1}$ and $R_{L2}$ represent load resistors used for converting current into voltage. The phase shifter to be used in this configuration employs a high amplitude accuracy phase shifter shown in FIG. 2A.

As shown in FIG. 15, inphase input signals $+I_{IN}$ and $-I_{IN}$ are input to the left upper stage, and quadrature input signals $+Q_{IN}$ and $-Q_{IN}$ are input to the right upper stage.

The first output signal $I_I$ is connected to the fourth output signal $Q_Q$ to subtract it. The second output signal $I_Q$ is connected to the fourth output signal $Q_I$. In this way, subtraction signal $X1=I_I-Q_Q$ and the addition signal $X2=I_Q+Q_I$ are obtained, respectively.

The fifth output signal $I_I$ is connected to the eighth output signal $Q_Q$ to subtract it. The sixth output signal $I_Q$ is connected to the seventh signal $Q_I$ to add it. Thus, the inphase output signals $I_{OUT}$ and $Q_{OUT}$ are obtained.

Though not shown in FIG. 15, this broadband and high accuracy image suppression filter circuit can further increase the precision by increasing the number of connection stages.

Figure 16A:
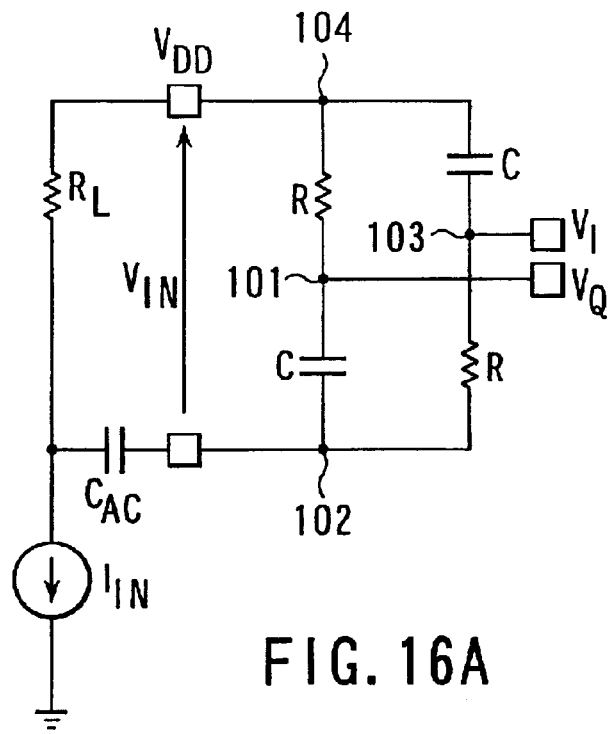
FIGS. 16A and 16B are circuit diagrams of a gain enhanced high phase accuracy phase shifter.

In FIG. 16A, a capacitor $C_{AC}$ and a resistor $R_L$ and a current source $I_{IN}$ are connected to $V_{IN}$ of the high phase accuracy phase shifter shown in FIG. 1A.

Figure 16B:
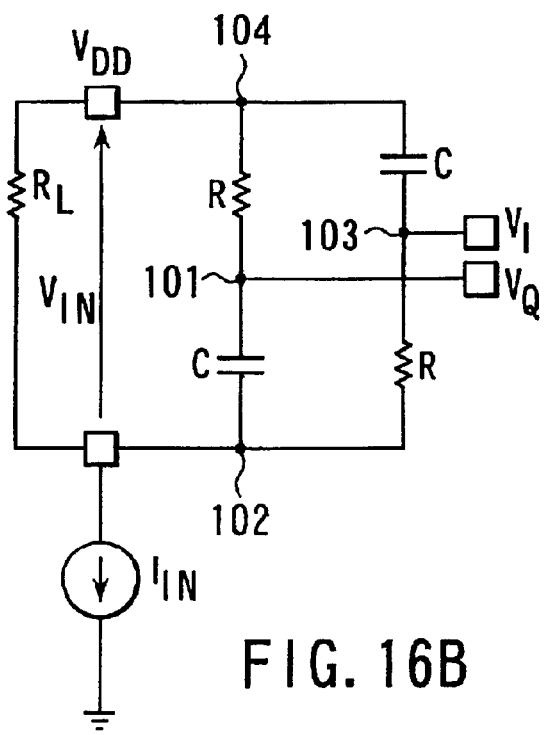

In FIG. 16B, a resistor $R_L$ and a current source $I_{IN}$ are connected to $V_{IN}$ of the high phase accuracy phase shifter shown in FIG. 1A, are current-driven.

Current driving of the high phase accuracy phase shifter has an effect of enhancing a gain of the phase shifter. Noise concerning characteristics will be improved by using this high gain, high phase accuracy phase shifter for the image suppression filter circuit shown in the aforementioned respective embodiments.

Figure 17:
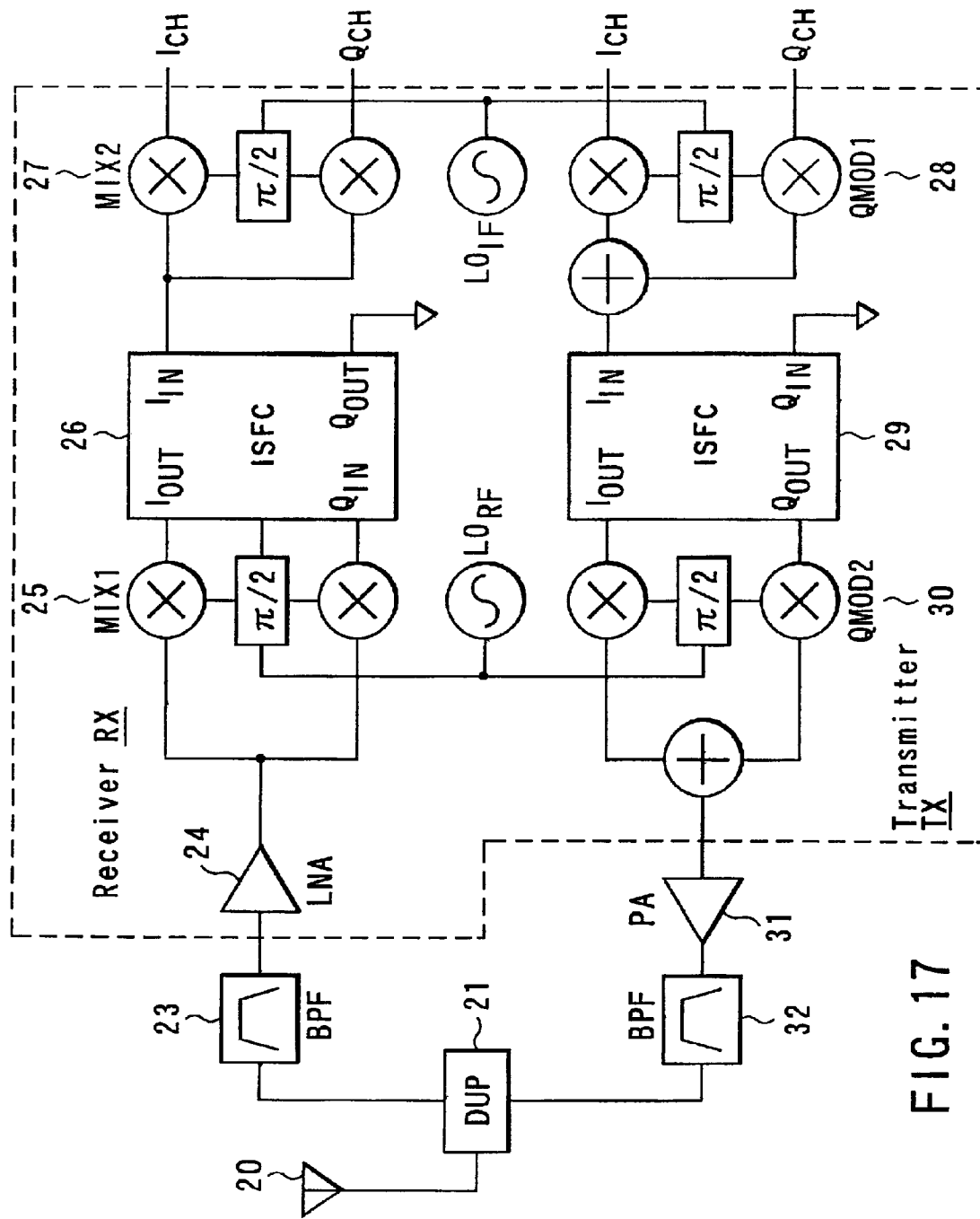
FIG. 17 is a block diagram of a transceiver using an image suppression filter circuit according to the present invention.

FIG. 17 is a configuration diagram of a transceiver system.

At the reception (RX) side, reception signal received by the antenna 20 is input to the quadrature mixer (MIX1) 25 through a duplexer (DUP) 21, a band bass filter (BPF) 23, and a low noise amplifier (LNA) 24. Here, the band pass filter (BPF) 23 has an object of taking in signal near the wanted band, and may be one that can reduce image signal to some extent.

Next, the output of the quadrature mixer (MIX1) 25 is input to the broadband image suppression filter circuit 26 described for respective embodiments. A image signal contained in the inphase I/quadrature Q channel signal of the quadrature mixer (MIX1) 25 is reduced by a broadband image suppression filter circuit (IRSC) 26 and input to a quadrature mixer (MIX2) 27 of the subsequent stage.

In FIG. 17, only one output (here, inphase output signal $I_{OUT}$) of the broadband image suppression filter circuit (IRSC) 26 is input to the quadrature mixer (MIX2) 27 of the subsequent stage, while the other output (here, quadrature output signal $Q_{OUT}$) is discarded. However, according to the case, both outputs can also be used.

The quadrature mixer (MIX2) 27 outputs inphase I/quadrature Q signal which become base band signal, to the A/D converter.

Next, transmission (TX) side will be described. First, inphase ICH, quadrature QCH signals of the base band signal are converted into the wanted IF signal by a quadrature modulator (QMOD1) 28 comprising a 90 degree phase shifter, a mixer and an adder. This IF signal is input to the broadband image suppression filter circuit (IRSC) 29 described for respective embodiments.

This broadband image suppression filter circuit (IRSC) 29 is not used for removing image signal, but for generating inphase I/quadrature Q signals different in phase by 90 degrees for IF signal over a broadband.

This uses the fact that signals different in phase by 90 degrees each other are generated, when one of inphase signal $I_{IN}$ and quadrature signal $Q_{IN}$ of the broadband image suppression filter circuit described for respective embodiments is input as it is evident from expression for determining inphase output signal $I_{OUT}$ and quadrature output signal $Q_{OUT}$ shown in expression (6), (7), (10), (11), (18), (19), (26), and (27), the other is not input.

Next, the output from this broadband image suppression filter circuit (IRFC) 29 is input to a quadrature modulator (QMOD2) 30 for generating RF signal without image. This output RF signal is output into the space through a power amplifier (PA) 31, a band pass filter (BPF) 32, a duplexer (DUP) 21, and an antenna 20.

RF local oscillation signal $LO_{RF}$ and IF local oscillation signal $LO_{IF}$ are input to inphase I/quadrature Q mixer for reception or quadrature modulator for transmission through a 90 degree phase shifter ($\pi/2$). The broadband image suppression filter circuit described for respective embodiments can be used also for the 90 degree phase shifter. The portion surrounded by a dashed line can be integrated in a IC chip.

As mentioned above, the present invention allows to realize an image suppression filter circuit which is highly accurate for a broadband, by cascade connecting phase shifter through subtracter and adder. Also, the integration thereof permits to eliminate external filter such as image suppression necessary for radio section, thereby to reduce the size and cost of the radio section.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image suppression filter circuit comprising:
   a first phase shifter which receives an inphase input signal, and outputs a first output signal and a second output signal having a phase component substantially orthogonal to the first output signal;

a second phase shifter which receives a quadrature input signal having a phase component substantially orthogonal to the inphase input signal, and outputs a third output signal and a fourth output signal having a phase component orthogonal to the third output signal;

a first subtracter which subtracts the fourth output signal from the first output signal, and outputs a subtraction signal;

a first adder which adds the second output signal and the third output signal, and outputs an addition signal;

a third phase shifter which receives the subtraction signal, and outputs a fifth output signal and a sixth output signal having a phase component orthogonal to the fifth output signal;

a fourth phase shifter which receives the addition signal, and outputs a seventh output signal and an eighth output signal having a phase component orthogonal to the seventh output signal;

a second subtracter which subtracts the eighth output signal from the fifth output signal, and outputs a subtraction result as an inphase output signal; and a second adder which adds the sixth output signal and the seventh output signal, and outputs an addition result as a quadrature output signal.

2. An image suppression filter circuit according to claim 1, comprising first buffer device which outputs the first output signal and the fourth output signal respectively to the first subtracter, and second buffer device which outputs the second output signal and the third output signal respectively to the first adder.

3. An image suppression filter circuit according to claim 2, wherein the first buffer device comprises a voltage-to-current converter having a differential circuit structure, the first subtracter subtracts in a current mode.

4. An image suppression filter circuit according to claim 2, wherein the second buffer device comprises a voltage-to-current converter having a differential circuit structure, the first adder adds in a current mode.

5. An image suppression filter circuit according to claim 2, comprising third buffer device which outputs the fifth output signal and the eighth output signal to the second subtracter, and fourth buffer device which outputs the sixth output signal and the seventh output signal to the second adder.

6. An image suppression filter circuit according to claim 5, wherein the third buffer device comprises a voltage-to-current converter having a differential circuit structure, the second subtracter subtracts in a current mode.

7. An image suppression filter circuit according to clam 5, wherein the fourth buffer device comprises a voltage-to-current converter having a differential circuit structure, the second adder adds in a current mode.

8. An image suppression filter circuit according to claim 1, wherein the first phase shifter and the second phase shifter have an identical circuit structure.

9. An image suppression filter circuit according to claim 1, wherein the third phase shifter and the fourth phase shifter have an identical circuit structure.

10. An image suppression filter circuit according to claim 1, wherein each of the first phase shifter, the second phase shifter, the third phase shifter and the fourth phase shifter comprises a bridge circuit including a first resistor, a first end connected to one end of the first resistor, a first capacitor having one end connected to the first end, a second end connected to the other end of the first capacitor, a second resistor having one end connected to the second end, a third end connected to the other end of the second resistor, a second capacitor having one end connected to the third end, and a fourth end connected to the other end of the second capacitor and the fourth end being connected with the other end of the first resistor;

the first phase shifter receiving the inphase input signal as potential difference between the fourth end and the second end of the bridge circuit, and outputting the first output signal as potential of the third end of the bridge circuit and the second output signal as potential of the first end of the bridge circuit;

the second phase shifter receiving the quadrature input signal as a potential difference between the fourth end and the second end of the bridge circuit, and outputting the third output signal as potential of the third end of the bridge circuit and the fourth output signal as potential of the first end of the bridge circuit;

the third phase shifter receiving the subtraction signal as potential difference between the fourth end and the second end of the bridge circuit, and outputting the fifth output signal as potential of the third end of the bridge circuit and the sixth output signal as potential of the first end of the bridge circuit; and the fourth phase shifter receiving the addition signal as potential difference between the fourth end and the second end of the bridge circuit, and outputting the seventh output signal as potential of the third end of the bridge circuit and the eighth output signal as potential of the first end of the bridge circuit.

11. An image suppression filter circuit according to claim 1, wherein each of the first phase shifter, the second phase shifter, the third phase shifter and the fourth phase shifter comprises a bridge circuit including a first resistor, a first end connected to one end of the first resistor, a first capacitor having one end connected to the first end, a second end connected to the other end of the first capacitor, a second resistor having one end to be connected to the second end, a third end connected to the other end of the second resistor, a second capacitor having one end connected to the third end, and a fourth end connected to the other end of the second capacitor and the fourth end being connected with the other end of the first resistor;

the first phase shifter receiving the inphase input signal as potential difference between the fourth end and the second end of the bridge circuit, and outputting the first output signal as potential of the third end of the bridge circuit and the second output signal as potential of the first end of the bridge circuit;

the second phase shifter receiving the quadrature input signal as potential difference between the fourth end and the second end of the bridge circuit, and outputting the third output signal as potential of the third end of the bridge circuit and the fourth output signal as potential of the first end of the bridge circuit;

the third phase shifter receiving the subtraction signal as potential difference between the fourth end and the second end of the bridge circuit, and outputting the fifth output signal as potential difference between the third end and the first end of the bridge circuit and the sixth output signal as potential difference between the fourth end and the second end of the bridge circuit; and the fourth phase shifter receiving the addition signal as potential difference between the fourth end and the second end of the bridge circuit and outputting the seventh output signal as potential difference between the third end and the first end of the bridge circuit and the eighth output signal as potential difference between the fourth end and the second end of the bridge circuit.

12. An image suppression filter circuit according to claim 1, wherein each of the first phase shifter, the second phase shifter, the third phase shifter and the fourth phase shifter comprises a bridge circuit including a first resistor, a first end connected to one end of the first resistor, a first capacitor having one end connected to the first end, a second end connected to the other end of the first capacitor, a second resistor having one end connected to the second end, a third end connected to the other end of the second resistor, a second capacitor having one end connected to the third end, and a fourth end connected to the other end of the second capacitor and the fourth end being connected with the other end of the first resistor;

the first phase shifter receiving the inphase input signal as potential difference between the fourth end and the second end of the bridge circuit, and outputting the first output signal as potential difference between the third end and the first end of the bridge circuit and the second output signal as potential difference between the fourth end and the second end of the bridge circuit;

the second phase shifter receiving the quadrature input signal as potential difference between the fourth end and the second end of the bridge circuit, and outputting the third output signal as potential difference between the third end and the first end of the bridge circuit and the fourth output signal as potential difference between the fourth end and the second end of the bridge circuit;

the third phase shifter receiving the subtraction signal as potential difference between the fourth end and the second end of the bridge circuit, and outputting the fifth output signal as potential of the third end of the bridge circuit and the sixth output signal as potential of the first end of the bridge circuit; and the fourth phase shifter; receiving the addition signal as potential difference between the fourth end and the second end of the bridge circuit, and outputting the seventh output signal as potential of the third end of the bridge circuit and the eighth output signal as potential of the first end of the bridge circuit.

13. An image suppression filter circuit according to claim 1, wherein the first phase shifter, the second phase shifter, the third phase shifter and the fourth phase shifter are respectively constituted of a bridge circuit including a first resistor, a first end connected to one end of the first resistor, a first capacitor having one end connected to the first end, a second end connected to the other end of the first capacitor, a second resistor having one end connected to the second end, a third end connected to the other end of the second resistor, a second capacitor having one end connected to the third end, and a fourth end connected to the other end of the second capacitor and the fourth end being connected with the other end of the first resistor;

the first phase shifter receiving the inphase input signal as potential difference between the fourth end and the second end of the bridge circuit, and outputting the first output signal as potential difference between the third end and the first end of the bridge circuit and the second output signal as potential difference between the fourth end and the second end of the bridge circuit;

the second phase shifter receiving the quadrature input signal as potential difference between the fourth end and the second end of the bridge circuit, and outputting the third output signal as potential difference between the third end and the first end of the bridge circuit and the fourth output signal is output as potential difference between the fourth end and the second end of the bridge circuit;

the third phase shifter receiving the subtraction signal as potential difference between the fourth end and the second end of the bridge circuit, outputting the fifth output signal as potential difference between the third end and the first end of the bridge circuit and the sixth output signal is output as potential difference between the fourth end and the second end of the bridge circuit; and the fourth phase shifter receiving the addition signal as potential difference between the fourth end and the second end of the bridge circuit, and outputting the seventh output signal as potential difference between the third end and the first end of the bridge circuit and the eighth output signal is output as potential difference between the fourth end and the second end of the bridge circuit.

14. An image suppression filter circuit comprising:

a pre-stage phase shifter; and a plurality of rear-stage phase shifters:

the pre-stage phase shifter including:

a first phase shifter which receives an inphase input signal, and outputs a first output signal and a second output signal having a phase component substantially orthogonal to the first output signal;

a second phase shifter which receives a quadrature input signal having a phase component substantially orthogonal to the inphase input signal, and outputs a third output signal and a fourth output signal having a phase component orthogonal to the third output signal;

a first subtracter which subtracts the fourth output signal from the first output signal, and outputs a subtraction signal; and a first adder which adds the second output signal and the third output signal, and outputs an addition signal; and each of the rear-stage phase shifter including:

a third phase shifter which receives the subtraction signal, and outputs a fifth output signal having a second phase component as for the subtraction signal and a sixth output signal having a phase component orthogonal to the fifth output signal;

a fourth phase shifter which receives the addition signal, and outputs a seventh output signal having the second phase component as for the addition signal and an eighth output signal having a phase component orthogonal to the seventh output signal;

a second subtracter which subtracts the eighth output signal from the fifth output signal, and outputs a subtraction result as an inphase output signal; and a second adder which adds the sixth output signal and the seventh output signal, and outputs an addition result as a quadrature output signal.

15. An image suppression filter circuit according to claim 14, comprising a buffer device which receives the first output signal and the fourth output signal respectively to the first subtracter, and the second output signal and the third output signal respectively to the first adder.

16. An image suppression filter circuit according to claim 14, comprising a buffer device which inputs the fifth output signal and the eighth output signal to the second subtracter, and the sixth output signal and the seventh output signal to the second adder.

17. An image suppression filter circuit according to claim 14, wherein the first phase shifter and the second phase shifter have an identical circuit structure.

18. An image suppression filter circuit according to claim 14, wherein the third phase shifter and the fourth phase shifter have an identical circuit structure.

19. A receiver apparatus comprising:
- an amplifier which amplifies an input signal to output an amplified signal;
- an input side mixer which receives the amplified signal and outputs an inphase signal and a quadrature signal having a phase component orthogonal to the inphase signal;
- an image suppression filter circuit according to claim 1 and configured to receive a first signal corresponding to the inphase signal and a second signal corresponding to the quadrature signal and output an inphase output signal;
- an output side mixer which converts the inphase output signal from the image suppression filter circuit into an inphase reception signal and a quadrature reception signal.

20. A transmitter apparatus comprising:
- a first quadrature modulator which converts a transmission inphase signal and a transmission quadrature signal into an intermediate frequency signal;
- an image suppression filter circuit according to claim 1 and configured to generate an inphase output signal and a quadrature output signal having a phase component orthogonal to the inphase signal based on the intermediate frequency signal; and
- a second quadrature modulator which converts the inphase output signal and the quadrature output signal into a radio frequency signal.

* * * * *